(12) United States Patent
Gromley et al.

(10) Patent No.: US 8,714,444 B1
(45) Date of Patent: May 6, 2014

(54) TIME ANALYSIS AT A BANKING SYSTEM CONTROLLED BY DATA BEARING RECORDS

(75) Inventors: Neil Gromley, Kensington, OH (US); Dustin Cairns, Deerfield, OH (US); Mike Lawver, Dover, OH (US); Rodney J. Reese, New Philadelphia, OH (US); B. Scott Harroff, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 1062 days.

(21) Appl. No.: 12/460,642

(22) Filed: Jul. 21, 2009

Related U.S. Application Data

(63) Continuation-in-part of application No. 11/825,770, filed on Jul. 9, 2007, now Pat. No. 7,848,830.

(60) Provisional application No. 60/819,692, filed on Jul. 10, 2006, provisional application No. 60/926,137, filed on Apr. 25, 2007, provisional application No. 60/926,210, filed on Apr. 25, 2007.

(51) Int. Cl.
*G06Q 40/00* (2012.01)

(52) U.S. Cl.
USPC ........................................................ 235/379

(58) Field of Classification Search
USPC ........................................................ 235/379
See application file for complete search history.

(56) References Cited

U.S. PATENT DOCUMENTS

| | | | |
|---|---|---|---|
| 2,912,066 A | 11/1959 | Ellithorpe | |
| 3,294,342 A | 12/1966 | McClure et al. | |
| 3,738,592 A | 6/1973 | Smith et al. | |
| 3,828,698 A | 8/1974 | Delamater et al. | |
| 3,861,119 A | 1/1975 | Taggart | |
| 4,392,119 A * | 7/1983 | Price et al. | 705/32 |
| 4,939,771 A | 7/1990 | Brown et al. | |
| 4,965,743 A | 10/1990 | Malin et al. | |
| 5,367,473 A | 11/1994 | Chu et al. | |
| 5,780,825 A | 7/1998 | Sato | |
| 6,052,364 A | 4/2000 | Chalmers et al. | |
| 6,414,635 B1 | 7/2002 | Stewart et al. | |
| 6,418,324 B1 | 7/2002 | Doviak | |
| 6,587,835 B1 | 7/2003 | Treyz et al. | |
| 6,611,537 B1 | 8/2003 | Edens et al. | |
| 6,661,884 B2 | 12/2003 | Shaffer et al. | |
| 6,850,901 B1 | 2/2005 | Sykes et al. | |
| 6,970,183 B1 | 11/2005 | Monroe | |
| 7,591,413 B1 * | 9/2009 | Block et al. | 235/379 |
| 2002/0049535 A1 | 4/2002 | Rigo et al. | |
| 2003/0061344 A1 * | 3/2003 | Monroe | 709/224 |
| 2003/0179290 A1 | 9/2003 | Frazzitta et al. | |
| 2004/0169722 A1 | 9/2004 | Pena | |
| 2004/0210474 A1 * | 10/2004 | Hart et al. | 705/11 |
| 2007/0084911 A1 * | 4/2007 | Crowell | 235/379 |

* cited by examiner

*Primary Examiner* — Michael G Lee
*Assistant Examiner* — David Tardif
(74) *Attorney, Agent, or Firm* — Black, McCuskey, Souers & Arbaugh, LPA

(57) ABSTRACT

A banking system controlled responsive to data bearing records utilizes a telephone system in acquiring, communicating, and/or processing time analysis data related to the duration of financial transaction activity in a drive-through lane of a bank facility. Vehicle sensors sense arrival and departure of vehicles in the drive-through lane. The system can calculate and store time data corresponding to each vehicle.

19 Claims, 22 Drawing Sheets

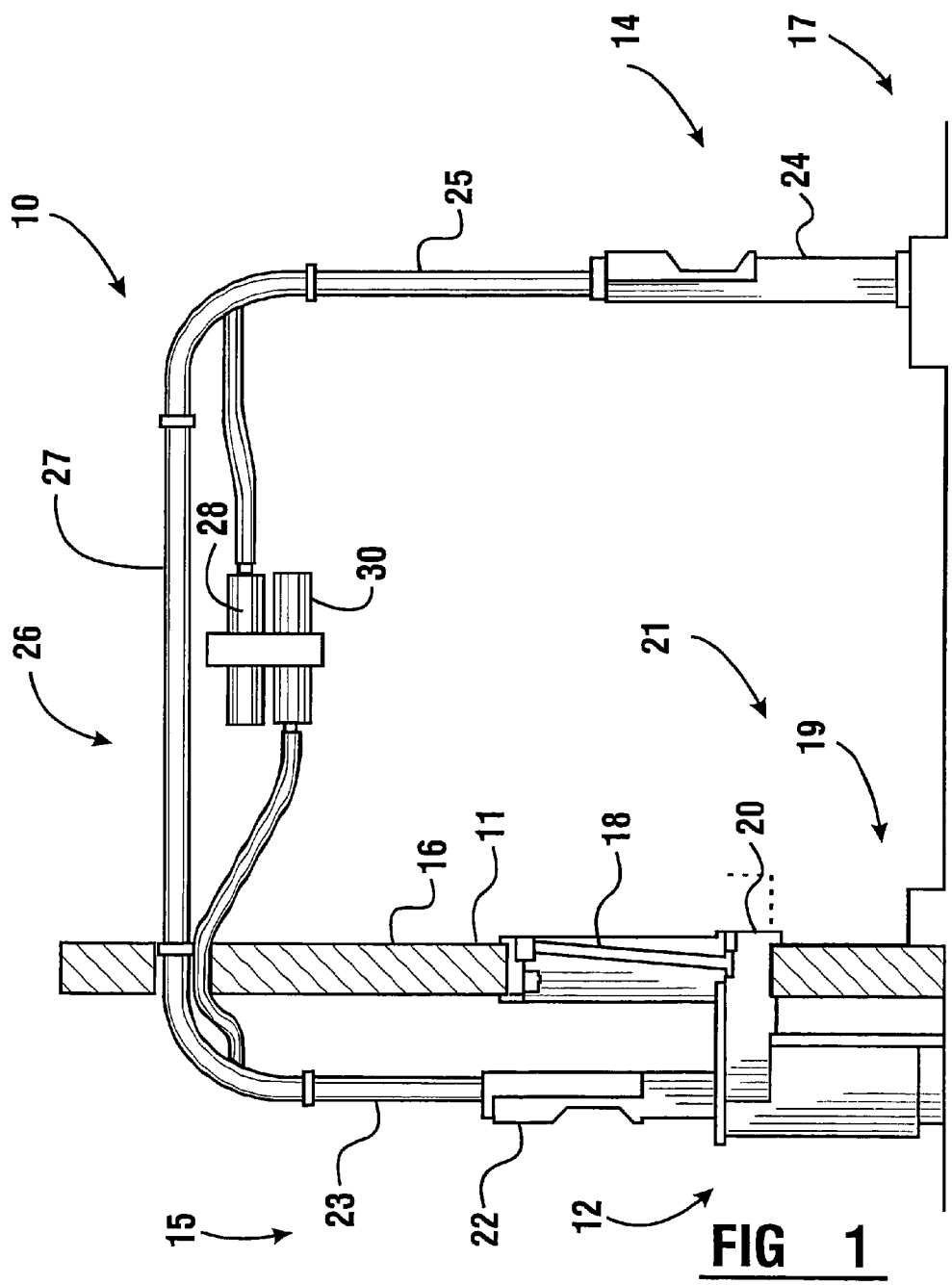

TIME ANALYSIS AT A BANKING SYSTEM CONTROLLED BY DATA BEARING RECORDS

This application is a continuation-in-part of application Ser. No. 11/825,770 filed Jul. 9, 2007 which claims benefit pursuant to 35 U.S.C. §119(e) of Provisional Application Ser. No. 60/819,692 filed Jul. 10, 2006 and Provisional Application Ser. Nos. 60/926,137 and 60/926,210 each filed Apr. 25, 2007. The disclosure of each of these applications is incorporated by reference herein in its entirety.

TECHNICAL FIELD

Exemplary embodiments of the invention relate to time analysis at a banking system controlled by data bearing records, which is classifiable in U.S. class 235, subclass 377 or 379.

BACKGROUND OF INVENTION

Exemplary systems can be used to conduct banking transactions between a service provider and remotely located customers. The systems can be used in drive-through banking applications as well as in other transaction environments, as shown in U.S. Pat. Nos. 5,299,891 and 6,146,057, which are owned by the assignee of the present invention and the disclosures of which are herein incorporated by reference. Other applications are shown in U.S. patent application Ser. No. 11/245,641 filed Oct. 7, 2005, as well as in U.S. Provisional Application 60/719,932 filed Sep. 16, 2005, the disclosures of which are also herein incorporated by reference.

Transaction drawers, which are also referred to herein as deal drawers, may be used to carry out transactions. Deal drawers may be used by a service provider such as a bank teller within a facility to transfer items between the teller and a customer outside the facility. This may be, for example, a person in a vehicle located in a drive-through lane adjacent to the teller. Bank tellers and other service providers may exchange items with customers through the use of deal drawers to carry out transactions. Exemplary deal drawers are shown in U.S. Pat. No. 6,789,860; U.S. Pat. No. 7,182,027; and U.S. patent application Ser. No. 11/529,463 filed Sep. 27, 2006; the disclosures of each of which are herein incorporated by reference.

Exemplary transaction systems can include pneumatic tube conveyor systems, deal drawers, and/or other types of transaction devices that enable exchange of items between a service provider and a customer to facilitate the carrying out of transactions. Exemplary improvements enable the tracking of transaction activity that occurs in connection with such transaction systems. In addition, exemplary improvements enable the tracking of transaction activity that includes vehicle movement and positioning, by utilizing existing telephone systems and associated wiring. Also, exemplary improvements enable the utilization of tracking data in evaluating and improving the operation of the transaction systems.

OBJECTS OF EXEMPLARY EMBODIMENTS

It is an object of an exemplary embodiment to provide an apparatus through which a customer may conduct a transaction with a remote service provider.

It is a further object of an exemplary embodiment to provide a transaction system through which a customer may conduct a transaction with a remote service provider without requiring the customer to surrender their card or other item including account data or data representative of value.

It is a further object of an exemplary embodiment to provide a transaction system through which a customer may use a debit card or other item requiring a PIN to conduct a transaction without having to disclose the PIN to a service provider.

It is a further object of an exemplary embodiment to provide a transaction system in which advantages can be achieved without having to make extensive modifications to existing system components.

It is a further object of an exemplary embodiment to provide a device which can receive card and/or other data at a customer station and deliver that received data at a remote service provider station so that a customer's account may be appropriately charged.

It is a further object of an exemplary embodiment to provide a device which transfers account and/or PIN information between a customer station and a service provider station with a minimal risk that the information will be compromised.

It is a further object of an exemplary embodiment to provide an apparatus which tracks the duration of transaction activity that is carried out for particular customers.

It is a further object of an exemplary embodiment to provide an apparatus which tracks data related to the duration of the transaction activity and other transaction data related to each particular transaction.

It is a further object of an exemplary embodiment to provide an apparatus that may be used in connection with transactions that are carried out in connection with a pharmacy.

It is a further object of an exemplary embodiment to provide an apparatus which utilizes a telephone system associated with the facility for acquiring and/or processing data related to the duration of transaction activity and other transaction data related to each particular transaction.

It is a further object of an exemplary embodiment to provide an apparatus which comprises at least one telephone switching interface device to enable the acquisition of data related to transaction activity and other transaction data related to each particular transaction.

It is a further object of an exemplary embodiment to provide an apparatus which comprises at least one processor operative to determine time values associated with data related to transaction activity and other transaction data related to each particular transaction.

It is a further object of an exemplary embodiment to provide methods of operation of transaction systems.

It is a further object of an exemplary embodiment to provide a method of operation of a transaction system in which a customer may retain possession of their debit card, credit card, or other item corresponding to their account or stored value while conducting a transaction with a remote service provider.

It is a further object of an exemplary embodiment to provide a method of carrying out a pharmacy transaction and which correlates information regarding the transaction with data concerning the duration of time that a customer was present at a drive-through transaction device.

It is a further object of an exemplary embodiment to provide a method of determining at least one time value corresponding to data related to transaction activity and other transaction data related to each particular transaction.

It is a further object of an exemplary embodiment to provide a method of mathematically modeling the operation of the facility.

Further objects of exemplary embodiments will be made apparent in the following Detailed Description of Exemplary Embodiments and the appended claims.

Many of the foregoing objects are accomplished in an exemplary embodiment by a system in which a pneumatic transfer apparatus transfers a carrier through a pneumatic tube by air pressure between a customer station and a service provider station. The exemplary system includes a carrier which may incorporate or have engaged therewith a body. The exemplary body includes a card reader and a keypad. The exemplary body further includes a processor and a memory in operative connection with a card reader and keypad. The exemplary body further includes at least one output device.

In an exemplary embodiment the customer at the customer station requests to purchase items, such as pharmacy items, from the service provider. This may include, for example, prescription medications that are to be delivered from a pharmacy. The service provider determines a total amount due from the customer. The body is then delivered to the customer station. The customer then passes his card through the card reader on the body and, if appropriate, inputs a PIN through a keypad on the body. The card and PIN data input by the customer is then stored in the memory of the body.

The body is then transferred through the pneumatic tube to the service provider station. In response to an input at the service provider station, the body outputs through the output device signals corresponding to the input customer data. The signals are then used by a computerized transaction device to process a charge against a customer's account. If the customer's account is successfully charged, the items may be delivered to the customer through the pneumatic tube system.

In some exemplary embodiments, the body which is used to transfer the customer account data may be integral with the carrier that is transported between the service provider station and the customer station through a pneumatic tube. In alternative exemplary embodiments, the body used to transfer such data may be removably positionable in an interior area of a carrier which is moved between a service provider station and a customer station. In some further exemplary embodiments, the body may also be movable between customers and the service provider through other means, such as through a movable deal drawer or other mechanism that enables the body to be moved between the customer and the service provider.

In some exemplary embodiments, the system may include at least one vehicle sensor adjacent to the transaction device that is used by the customer, such as the pneumatic carrier delivery and receiving device or the deal drawer. The vehicle sensor is operative to sense a vehicle in a position adjacent to the transaction device. In some exemplary embodiments, the vehicle sensor includes a wireless communication device which transmits signals indicative of when a vehicle is in a position adjacent to the transaction device.

The at least one vehicle sensor is in operative connection through appropriate interfaces with at least one processor. The at least one processor determines at least one time value associated with a time that vehicles are in the position adjacent to the transaction device. The at least one processor of exemplary embodiments stores multiple time values, such as a time when the vehicle enters the position and a time when the vehicle leaves the position, as well as an elapsed time that the vehicle is in the position for each transaction. Of course these values are exemplary.

In exemplary embodiments, the at least one processor is also operative to store the at least one time value, as well as at least one data item that is associated with the respective transaction. Such data items may include information provided by the computerized transaction device. Such data items may include the types and amounts of banking transactions conducted with the user in the vehicle, images of checks received from a user, information about cash received from or provided to a user, assessments of charges, or other information that is provided by one or more computerized transaction devices. Alternatively, in a pharmacy transaction environment, the data items may include information concerning pharmacy items provided, prescription data, data related to charges, images of prescriptions that are received, and/or sound files related to discussions that are had between the clerk and/or the pharmacist and the customer. Of course these approaches are exemplary of approaches that may be used.

In exemplary embodiments, the at least one processor that is in operative connection with the at least one data store that includes the data related to transactions, may be operated to provide reports. The reports may selectively include, or provide outputs of, the stored data that corresponds to the transactions, including the time values. Such information may be useful for documenting the transactions, evaluating the time required for transactions, and other purposes.

In some exemplary embodiments, the system may include at least one vehicle sensor adjacent to an at least one through lane entrance of the facility. The at least one vehicle sensor is operative to sense a vehicle in a position at the entrance to the at least one through lane.

In some exemplary embodiments, the system may include at least one vehicle sensor adjacent to an at least one through lane exit of the facility. The at least one vehicle sensor is operative to sense a vehicle in a position at the exit from the at least one through lane.

In some exemplary embodiments, the system may include at least one transaction initiation sensor adjacent to the transaction device. The at least one transaction initiation sensor is operative to sense an initiation of a transaction.

In some exemplary embodiments, the vehicle sensor adjacent to the transaction device is in operative connection with a telephone switching interface device which communicates signals indicative of when a vehicle is in a position adjacent to the transaction device. In some exemplary embodiments, the telephone switching interface device is in operative connection with at least one processor.

In some exemplary embodiments, the vehicle sensor adjacent to the at least one through lane entrance of the facility is in operative connection with a telephone switching interface device which communicates signals indicative of when a vehicle is in a position adjacent to the through lane entrance. In some exemplary embodiments, the telephone switching interface device is in operative connection with at least one processor. The at least one processor determines at least one time value associated with a time that vehicles are in the position adjacent to the through lane entrance. The at least one processor of exemplary embodiments stores multiple time values, such as a time when the vehicle enters the position adjacent to the through lane entrance and a time when the vehicle leaves the position, as well as an elapsed time that the vehicle is in the position adjacent to the through lane entrance. Of course, these values are exemplary.

In some exemplary embodiments, the vehicle sensor adjacent to the at least one through lane exit of the facility is in operative connection with a telephone switching interface device which communicates signals indicative of when a vehicle is in a position adjacent to the through lane exit. In some exemplary embodiments, the telephone switching interface device is in operative connection with at least one processor. The at least one processor determines at least one time value associated with a time that vehicles are in the position adjacent to the through lane exit. The at least one processor of exemplary embodiments stores multiple time values, such as a time when the vehicle enters the position adjacent to the through lane exit and a time when the vehicle leaves the position, as well as an elapsed time that the vehicle is in the position adjacent to the through lane exit. Of course, these values are exemplary.

In some exemplary embodiments, the transaction initiation sensor adjacent to the transaction device is in operative connection with a telephone switching interface device which communicates signals indicative of when a transaction is initiated. In some exemplary embodiments, the telephone switching interface is in operative connection with at least one processor. The at least one processor determines at least one time value associated with a time that a transaction is initiated.

In some exemplary embodiments, the at least one processor that is in operative connection with the at least one data store that includes the data related to transactions, may be operated to mathematically model the operation of the facility and to provide reports containing information useful for altering the operation of the facility.

BRIEF DESCRIPTION OF DRAWINGS

FIG. 1 is a schematic view of an exemplary apparatus including a pneumatic transfer apparatus and a deal drawer used for carrying out transactions.

DETAILED DESCRIPTION OF EXEMPLARY EMBODIMENTS

Figure 3:
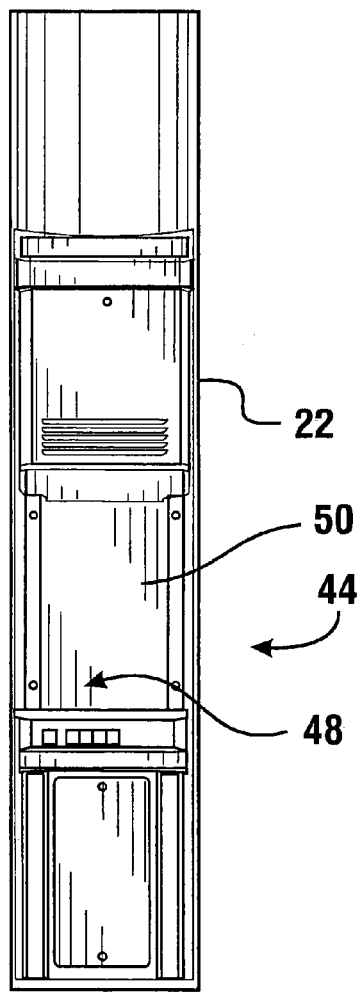
FIG. 3 is a front plan view of the portion of the service provider station shown in FIG. 2.

Referring now to the drawings and particularly to FIG. 1, there is shown therein an exemplary embodiment of an apparatus included in a transaction system, generally indicated 10.

The transaction system 10 includes a service provider station, generally indicated 12, and a customer station, generally indicated 14. In an exemplary embodiment, the service provider station is positioned within a facility 11 in which goods or services are sold. In one exemplary embodiment, the service provider station is positioned in an interior area 15 of the facility adjacent to a pharmacy operation which enables pharmacy items, such as medications, to be delivered to customers adjacent to the customer station 14. In the exemplary embodiment, customer station 14 is positioned adjacent to a drive-through lane 17 in which customers may carry out transactions while positioned in a vehicle.

In the exemplary embodiment, the service provider station is also positioned adjacent to a drive-through window 18. A movable drawer mechanism 20 such as a deal drawer, may be used by the service provider at the service provider station to exchange items with customers at a customer station 21 which is in a drive-through lane 19 adjacent to the drawer mechanism 20.

The exemplary service provider station includes a service provider terminal 22. The exemplary customer station includes a customer terminal 24 which is also referred to herein as a transaction device. Terminals 22 and 24 are connected by a pneumatic tube transfer conduit 26. The pneumatic tube transfer conduit includes a first generally vertically extending leg portion 23 which is adjacent to and in communication with the service provider terminal 22. The second generally vertically extending leg portion 25 is adjacent to and in communication with the customer terminal 24. A transversely extending portion 27 extends generally horizontally between the first and second leg portions. The transverse portion 27 is connected to the vertically extending leg portions through radiused bends in the conduit which are radiused to enable the passage of a pneumatic carrier therethrough between the service provider terminal and the customer terminal.

A first blower 28 is connected to transfer conduit 26 generally in the area above the customer terminal 24. Blower 28 may be selectively operated to draw negative pressure in the transfer conduit in the area generally above the customer terminal. Blower 28 further includes suitable valving so that when the blower 28 is not operated, air is generally prevented from entering the transfer conduit 26 through the blower 28. A blower 30 similar to blower 28 is connected to the transfer conduit in the area generally above service provider terminal 22. Blower 30 may be operated to selectively produce negative pressure in the transfer conduit above the service provider terminal. Like blower 28, when blower 30 is not operating, air is generally prevented from entering the transfer conduit through the blower.

Figure 5:
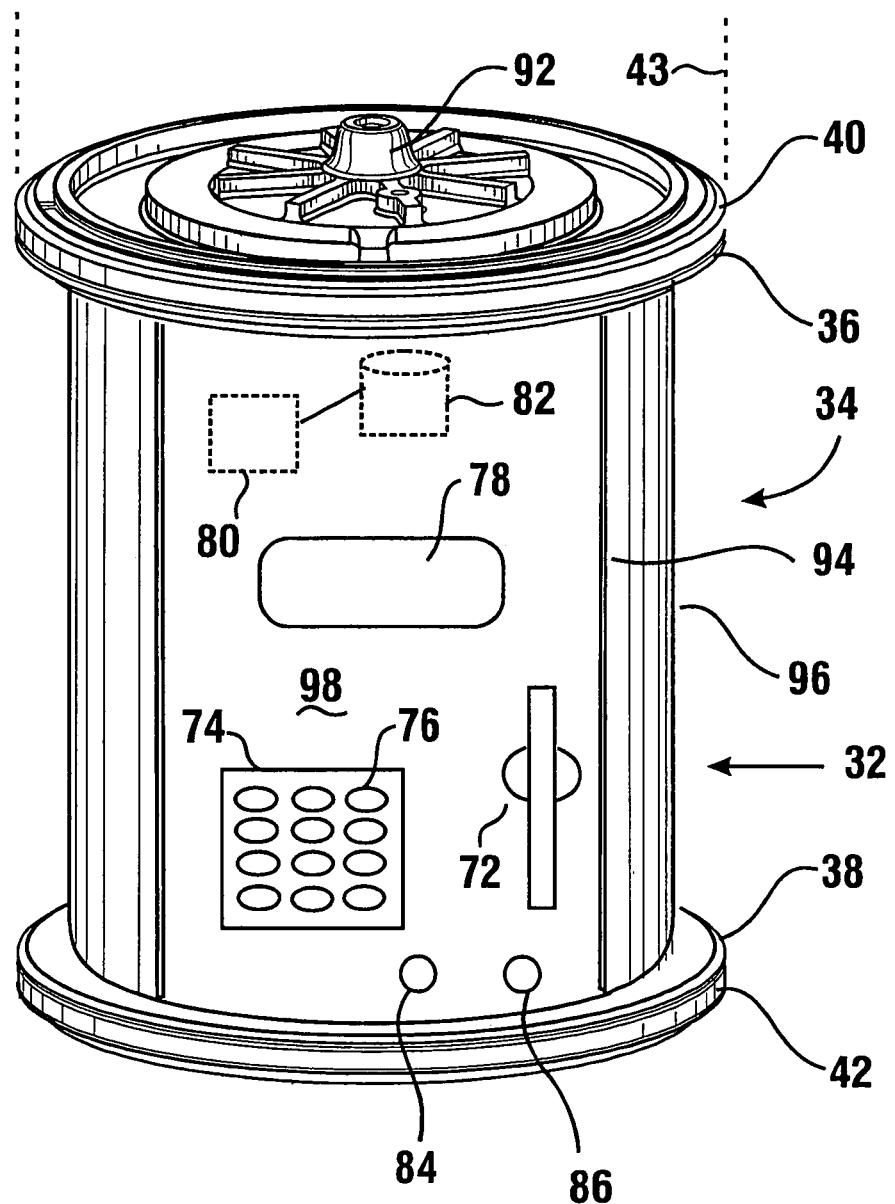
FIG. 5 is an isometric view of an exemplary carrier which may be used in connection with the system shown in FIG. 1.

In an exemplary embodiment, a carrier 32 of the type shown in FIG. 5, is enabled to be selectively moved between the service provider terminal and the customer terminal by the application of differential pressure produced in the tube by blowers 28 and 30. As shown in FIG. 5, the exemplary carrier 32 includes a housing 34. The housing includes a first end member 36 and a second end member 38. The first end member 36 includes an annular resilient seal ring 30 supported thereon. Likewise, second end member 38 has an annular resilient seal ring 42 supported thereon. The seal rings provide slidable and generally fluid tight engagement between the carrier housing and an interior wall of the pneumatic tube as schematically indicated 43 in FIG. 5. The angular seal rings enable the carrier to be moved in the tube through the application of a pressure differential on opposite sides of the carrier.

Figure 2:
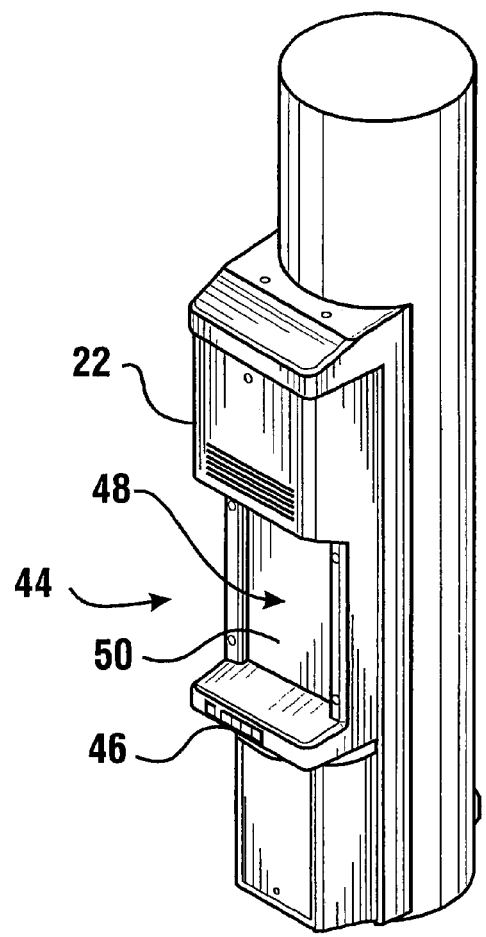
FIG. 2 is an isometric view of a portion of the service provider station as shown in FIG. 1.

FIGS. 2 and 3 show the exemplary service provider terminal 22 in greater detail. The exterior of the service provider terminal includes an interface generally indicated 44 which includes a control panel 46. Control panel 46 includes buttons and indicators which are used by a service provider to cause the carrier to move between the service provider station and the customer station, as well as to input other commands. In an exemplary embodiment, the control panel 46 includes a button which may be actuated to apply differential pressure to transfer the carrier from the service provider station to the customer station. Another button included on the control panel may be actuated to apply differential pressure to move the carrier from the customer station to the service provider station.

In an exemplary embodiment, the customer and service provider stations include an audio interface which includes a microphone and speaker at each of the service provider and customer stations. This enables a service provider to audibly communicate with the customers. Buttons or similar devices on the control panel 46 may be selectively actuated by the service provider to enable the service provider to speak to and/or listen to a customer at the customer station.

The exemplary control panel 46 of the service provider station may further include indicator lights or other devices for providing the service provider with information concerning the status of components in the system. Alternative embodiments of the system may include additional devices for communicating with customers. These may include, for example, video communication devices or other devices for facilitating communication between the customer and the service provider.

The exemplary service provider terminal 22 further includes a transfer opening 48. The transfer opening extends through the transfer conduit and enables access to the carrier 32. In the exemplary embodiment, the service provider is enabled to place items to be transferred to a customer into an interior area of the carrier when the carrier is positioned at the service provider station. In exemplary embodiments, the items to be transferred may include pharmacy items, such as medical items, instruction booklets, currency, credit card vouchers, receipts, prescriptions and other documents and things that are exchanged in performing a transaction.

In the exemplary embodiment, the transfer opening 48 includes a door 50. Door 50 is preferably a sliding type door that is movable up and down so as to selectively cover or enable access to the carrier through transfer opening 48. The door 50 is selectively moved between its respective positions by a door moving mechanism (not shown). The door moving mechanism controls the opening and closing of the door 50 at appropriate times and responsive to the control circuitry of the system. The exemplary service provider station as well as the customer station may further include features of the incorporated disclosure of U.S. Pat. No. 6,146,057 or other incorporated disclosures. Similarly, the customer station 14 includes appropriate mechanisms to enable a customer in a position at the customer station adjacent to the customer terminal 24, which serves as a pneumatic carrier delivery and receiving device, to access the carrier 32 when the carrier is positioned thereto.

Figure 4:
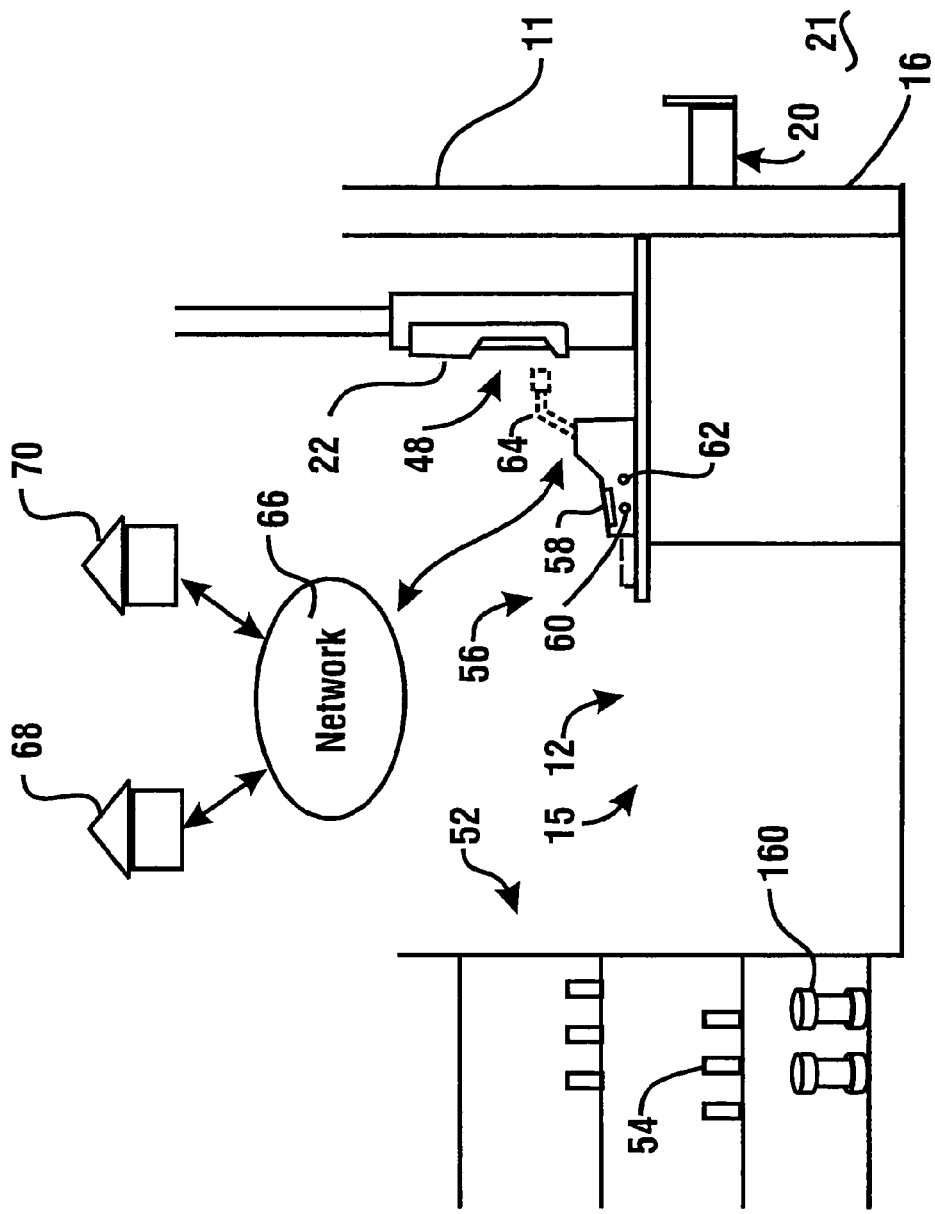
FIG. 4 is a schematic view of the service provider station and the transaction networks connected thereto for purposes of assessing charges against customers' accounts.

FIG. 4 shows an exemplary service provider station which is positioned within a facility adjacent to a pharmacy which is schematically indicated 52. Pharmacy 52 includes items schematically indicated 54 which are purchased by customers and delivered to customers at the customer stations through the pneumatic tube or the movable drawer mechanism.

An exemplary service provider station further includes a computerized transaction device which is alternatively referred to herein as a charge device 56. In exemplary embodiments the charge device may include a cash register, POS terminal or other device that can be used to cause a charge to be assessed to a customer's account. In the exemplary embodiment, the charge device 56 includes an amount input device 58. The amount input device 58 includes input devices, for example numerical keys or other types of input devices, that can be used to receive inputs and/or instructions related to amounts to be charged to a user's account.

The exemplary charge device 56 further includes in operative connection therewith, a reading device 60. The reading device 60 may be used in a manner later described to receive signals output from an output device on the carrier or other body. The exemplary charge device further includes a further output device 62. Output device 62 in the exemplary embodiment, may be used to provide an output in the manner later discussed so as to indicate the status of certain transaction steps which may cause actions to be taken, for example to erase information stored in memory on the carrier or other body. As indicated in phantom in FIG. 4, an exemplary embodiment of the charge device may include a selectively positionable input/output device 64. The input/output device 64 may include the functions of the reading device 60 and 62. In exemplary embodiments where the carrier 32 is held captive within the pneumatic transfer tube conduit, the input/output device 64 may be selectively positioned adjacent to the transfer opening 48 so as to achieve communication with the processor and memory supported on the carrier.

As shown in FIG. 4 the charge device 56 may also be in operative connection with remote computers that can assess charges to customers' accounts. Such communication may be achieved through a network schematically indicated 66. Network 66 may be comprised of a single network or multiple connected networks. Network 66 enables communication with entities that can assess a charge to a debit account such as an account of a customer at a bank schematically indicated 68. Alternatively or in addition, network 66 may enable communication with a credit charge processing entity 70, such as an entity associated with VISA or MasterCard Of course this arrangement for assessing charges against customers accounts is exemplary and in other embodiments other approaches and system configurations may be used.

The computerized transaction device may also include other features for recording data items associated with transactions. This may include, for example, suitable reading devices and/or network interfaces that are operative to record the type and number of pharmacy items or other items that are provided to each customer. Alternatively or in addition, exemplary computerized transaction devices may be in operative connection with devices which capture documents, images or other information. This may include, for example, a scanning device that can be used to scan prescription data received from respective customers. In still other embodiments, the computerized transaction device may be in operative connection with systems of the type described in U.S. Pat. No. 6,711,460 and/or U.S. patent application Ser. No. 10/805,149 filed Mar. 19, 2004, the disclosures of each of which are incorporated herein by reference. Such systems of the incorporated disclosure may provide data concerning medical items and the compounding and fulfillment of prescriptions related to such items.

In still other embodiments, systems of the type described in U.S. patent application Ser. No. 09/414,290 filed Oct. 7, 1999, the disclosure of which is incorporated herein, may be used. Such systems may be used to capture images of users, items, documents, merchandise, currency, checks or other things associated with transactions. Alternatively or in addition, such systems may be used to capture video and/or audio communications which occur between service providers, customers, pharmacists and other persons associated with transactions. Of course these data items are merely exemplary of the types of data that may be recorded in connection with such transactions.

It should be understood that, while a pharmacy system has been described in connection with some exemplary embodiments, the principles discussed herein may be used in connection with other types of transaction systems. For example, banking transaction systems may include one or more computerized transaction devices which are operative to facilitate the carrying out of banking transactions for users. This may include, for example, systems which credit or debit user accounts, cause and record the dispensing of cash, image checks, provide updated balances, provide rolled coin, and carry out other transactions which are associated with the banking activity. Such systems may also include provision for recording audio and video data associated with each transaction.

Other types of systems may include other types of computerized transaction devices that record data items associated with transactions as are appropriate for the particular types of transactions being carried out through a particular system.

As shown in FIG. 5, the exemplary carrier 32 includes a body 96. Body 96 bounds an interior area of the carrier which is adapted for holding items that are transferred between customers and the service provider. In the exemplary embodiment, body 96 has an opening 94.

Opening 94 provides access to the interior area of the carrier. A movable cover 98 is selectively positionable so as to block access to the interior area through the opening or to enable access thereto. Movable cover 98 is movable through rotation of an end cap 92 in the manner described in the incorporated disclosure.

In the exemplary embodiment carrier 32 serves as a data transfer unit for transferring account and/or user identifying information between a customer and a service provider. In the exemplary embodiment the carrier enables card, PIN and/or other data to be provided by the customer at the customer station, and then to have such data delivered to the charge device at the service provider station.

The exemplary carrier 32 includes a card reader 72 in supporting connection with the movable cover. In the exemplary embodiment the card reader 72 is adapted to receive a magnetic stripe card therein. The card reader receives a card of a customer into a slot and is operative to read magnetic stripe data from the card as the card is either inserted and/or withdrawn from the card reader slot.

Carrier 32 further includes in supporting connection with the movable cover 98, a recessed keypad 74. Keypad 74 includes a plurality of keys 76. In the exemplary embodiment keys 76 are alphanumeric keys which facilitate the input of a PIN or other data or instructions by the customer.

In the exemplary embodiment the movable cover 98 further includes an output device 78 which comprises a display. Display 78 in the exemplary embodiment includes an LCD type display which is enabled to output alphanumeric data to a user. It should be understood however that the input and output devices shown on the carrier 32 are exemplary and in other embodiments other or additional types of input and/or output devices may be used.

Carrier 32 further has in supporting connection therewith a processor schematically indicated 80. Processor 80 includes the capability to process instructions so as to carry out the functions later described. Processor 80 is in operative connection with a memory schematically indicated 82. Memory 82 is operative to hold instructions to be executed by the processor as well as other data as hereafter described.

Carrier 32 of the exemplary embodiment further includes an output device 84. In the exemplary embodiment output device 84 provides outputs in the form of signals. In the exemplary embodiment the signals are infrared signals. It should be understood however that in other embodiments other types of output devices may be used, including other types of radiation emitting devices including devices such as LEDs or RF output devices. Other output devices used in embodiments may include (but are not limited to) electrical connectors, displays, RF backscatter devices, sonic output devices or other types of devices which are operative to output or otherwise provide signals.

In the exemplary embodiment, carrier 32 further includes a reading device 86. Reading device 86 is operative to receive signals from the output device 62 of the charge device in the manner earlier explained. The output device 84 and the reading device 86 are also in operative connection with the processor 80 and the memory 82.

It should be understood that although in the embodiment shown in FIG. 5 the carrier body is integrally formed with the transaction data transfer terminal, in other embodiments other types of data transfer devices may be used. For example a body may be provided which is separable from the carrier so as to enable the body to be removed from the pneumatic transfer apparatus. In further alternative embodiments a carrier may be removable from the pneumatic transfer conduit such that the carrier may be used for data transfer, and a different carrier placed in the conduit and used to transport items between the service provider and the customer. Of course numerous alternative approaches may be used. Still other embodiments may not include a carrier or other device which provides such data transfer.

Figure 8:
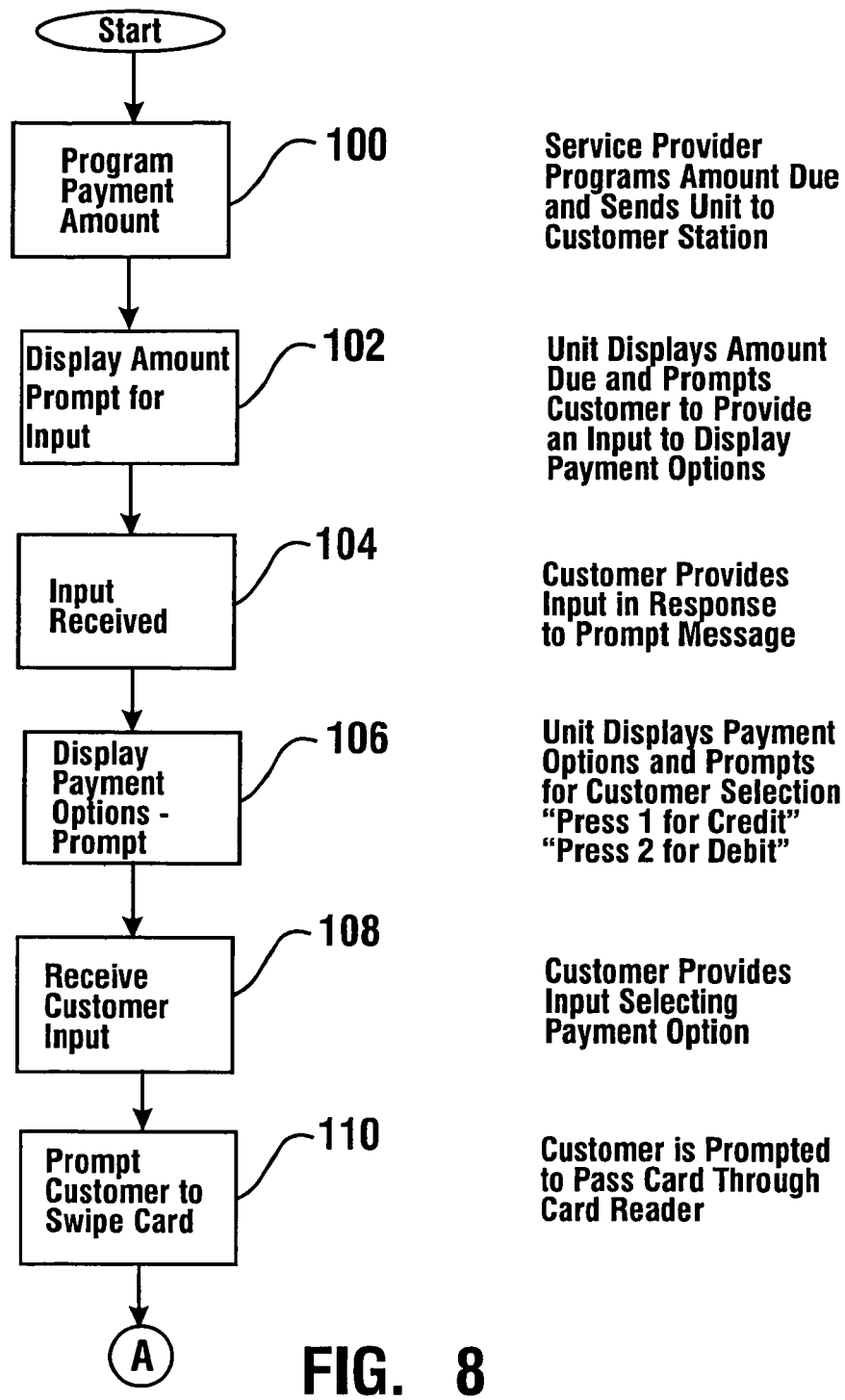
FIGS. 8 through 10 are schematic views of transaction steps which are conducted through operation of the transaction transfer unit of an exemplary embodiment.
Figure 9:
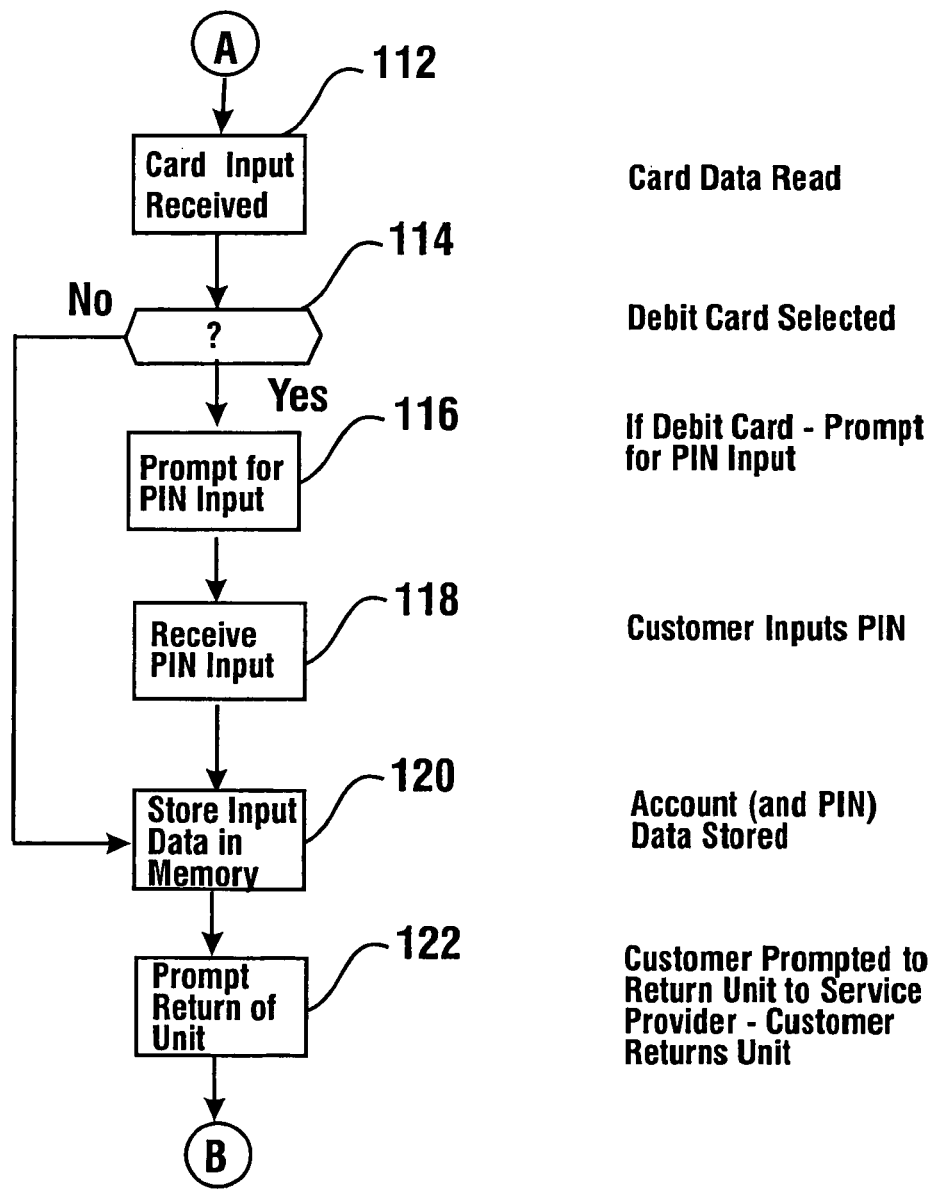

Operation of an exemplary system for purposes of carrying out a transaction between a service provider and a customer will now be explained with reference to FIGS. 8 through 10. In this exemplary embodiment the service provider receives requests from the customer at the customer station, such as a request to purchase items. In the exemplary embodiment these would be pharmacy items 54 which have an associated charge. The customer may provide documents, prescriptions or other information to the service provider. This may be done by transporting these items in the interior area of the carrier, by providing information through the communication system provided between the customer station and service provider station, or combinations thereof. The items requested by the customer will have an associated charge. This charge can be calculated either by the service provider or through use of the amount input device on the charge device or other input mechanisms.

In this exemplary embodiment if the customer indicates to the service provider that they wish to charge their debit or credit card account for the items to be delivered, the service provider operates the charge device 56 through appropriate inputs, to program the amount the customer is to pay into the carrier 32. This is reflected by a step 100 shown in FIG. 8. In the exemplary embodiment the programming of the amount information into the memory 82 of the carrier is accomplished by the transmission of signals from the output device 62 (or with the combined input and output device 64) which are received by the reading device 86. Once the amount to be paid is programmed into the memory of the carrier, the service provider provides appropriate inputs at the service provider's station to cause the carrier to be transmitted to the customer station.

At the customer station the processor 80 operates to cause the amount due from the customer to be output through the display 78. The processor also operates in response to programmed instructions in memory to output a prompt through the display for the customer to provide an input so as to display and eventually select their payment options. This is indicated by a step 102. The customer then provides the requested input in response to the prompt indicated by step 104. The input may be for example, the customer touching one or more keys 76 of the keypad.

In response to input received from the customer in step 104 the processor is operative to cause the display 78 to output payment options for the user. This is represented by a step 106. The output payment options may include for example, prompting the customer to press 1 for a credit transaction and to press 2 for a debit transaction. The customer then provides a selected input as represented by step 108.

In response to the customer providing the payment option selection, the processor is operative to cause the display 78 to output a prompt requesting that the user swipe their card through the card reader 72. This is represented by step 110. The input by the user from their card through the card reader causes data to be read from the magnetic stripe of the card as represented by step 112 in FIG. 9. The processor then operates in accordance with its programmed instructions to determine if it was a debit or credit card transaction that the customer selected. This is represented in step 114. If the customer has requested a debit card transaction, the processor operates to provide an output prompting the customer to input their PIN as indicated in step 116. When the PIN data is received as reflected in step 118, the processor then operates to cause the card and PIN data to be stored in the memory on the carrier as reflected in step 120. Of course as schematically indicated in FIG. 9, if the customer has requested a credit card transaction which does not require PIN data, only the card data is stored.

Upon receiving the data from the customer necessary to assess a charge against the customer's selected account, the processor operates in accordance with its instructions to provide an output through a display 78 prompting the user to return the carrier to the service provider station. This is represented in FIG. 9 by a step 122. In response to a prompt, the customer in a vehicle at the transaction device in some embodiments may cause the carrier to be transferred to the service provider station through one or more inputs to input devices at the customer terminal. Alternatively in some embodiments the customer may notify the service provider that the customer is ready to send the carrier, and the service provider may provide the inputs necessary to transfer the carrier from the transaction device to the service provider terminal. It should be further understood that in some embodiments the processor may operate in accordance with its programming to provide additional steps and functions such as to request that the customer retry the card reading steps and/or PIN entry steps in cases where the data has not been properly received or stored, or in cases where the customer indicates that they have made an error.

Figure 10:
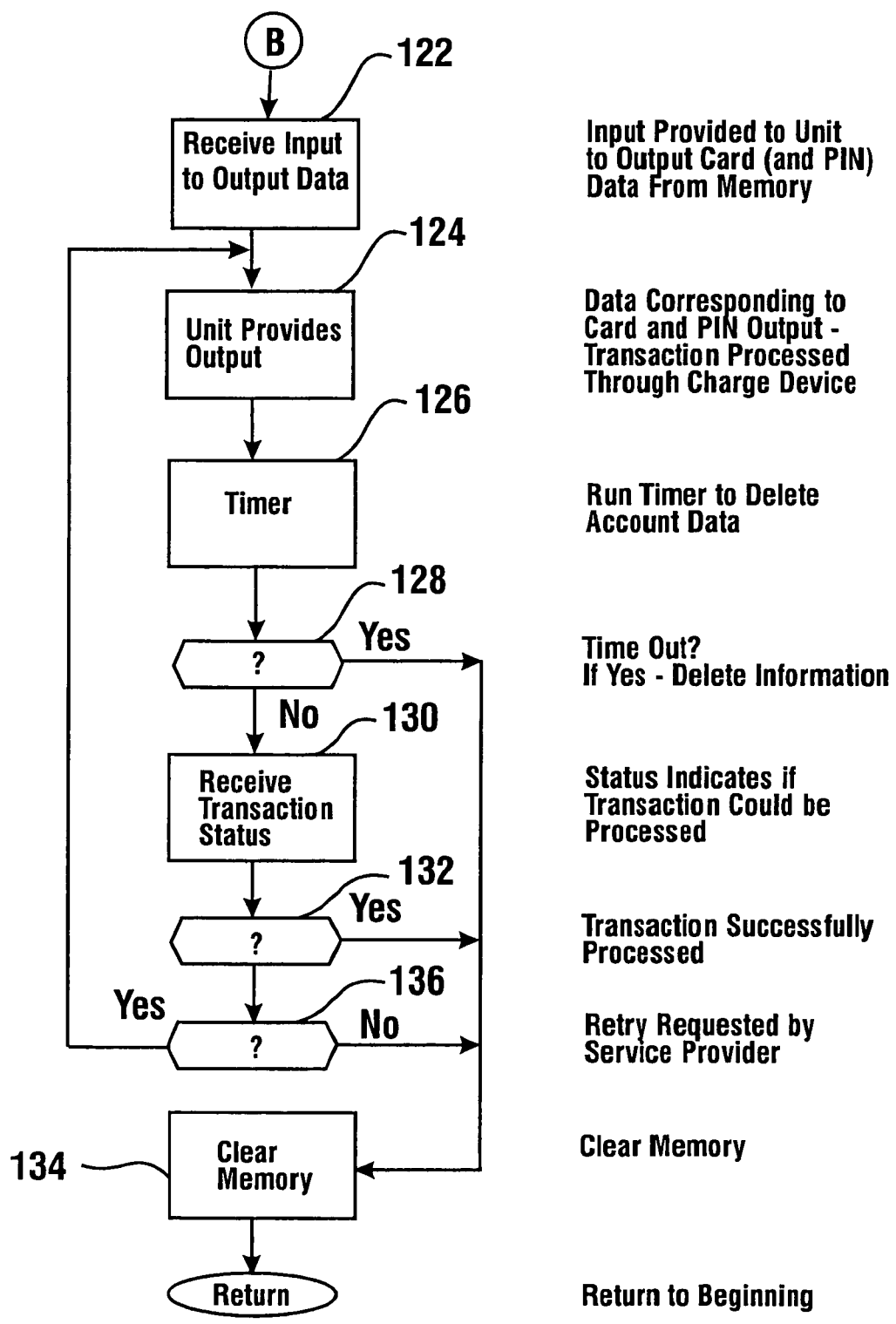

As represented in FIG. 10 with the carrier returned to the service provider station, the service provider through operation of the charge device 56 provides at least one input to the reading device 86 on the carrier. This is done by the transmission of signals to the output device 62 and/or through the combined input/output device 64. This input is operative to notify the processor on the carrier that the data stored in memory necessary to process the transaction, is to be output. This is represented by a step 124.

As indicated in step 126, the carrier then outputs through the output device 84, signals corresponding to the data stored in memory. This data includes card data and, if appropriate, personal identification number (PIN) data. The data output through the output device 84 is received by the reading device 60 of the charge device and/or by the combined input/output device 64.

In response to receiving the data stored in memory of the carrier, the charge device is operative to cause a charge to be assessed against the user's account. In the exemplary embodiment the charge device is operative to send appropriate messages through the network 66 to the entity that can assess the charge against the user's selected account. The appropriate charge assessing entity through operation of its computer systems generally responds to the charge device with appropriate messages indicating that the charge is acceptable against the requested account. Of course if the charge is not authorized, then one or more messages indicative of this situation is sent through the network to the service provider. In the exemplary embodiment the service provider is notified whether or not the charge is acceptable through outputs provided through one or more output devices on the charge device 56. These may be outputs provided, for example, through a display on a point of sale terminal, electronic cash register, card authorization terminal or other apparatus integral with or connected to the devices used to communicate the messages to assess the charge against the user's account.

In the exemplary embodiment when the carrier outputs the data corresponding to the customer's account information, a timer is run and reflected in a step 126. This is done in the exemplary embodiment so that the data input by the customer is eventually automatically erased from the memory of the carrier unit. This reduces the risk that unauthorized access to this information will be obtained. If the preset time elapses without further action as indicated in a step 128, such data in the memory 82 on the carrier is erased.

In the exemplary embodiment an output is provided through the output device 62 of the charge device or through the combined input/output device 64, to indicate to the processor on the carrier whether the transaction could be successfully processed. This is indicated in a step 130. As indicated in step 132, if the transaction was successfully processed, the processor operates to clear the memory of the customer data as indicated in step 134. Alternatively if the transaction could not be successfully processed, but the service provider chooses to resubmit the transaction, the service provider may through the charge device cause the carrier to output the transaction data again as reflected at a step 136. As FIG. 10 indicates however, the carrier will output the transaction data a second time only if the timing function has not caused the data in memory to be automatically erased. If the service provider chooses not to retry the requested transaction in step 136, the customer transaction data stored in memory on the carrier is erased. This readies the carrier to receive new charge account data from either the same or another customer.

If the charge is successfully assessed to the customer's account, the service provider in the exemplary embodiment will provide inputs to the service provider terminal so as to open the movable cover 98 on the carrier. The service provider will then place the items that have been purchased by the customer in the interior area of the carrier and provide inputs to close the movable cover. Further inputs provided by the service provider to the service provider terminal will operate the blower so as to cause the carrier to be transported to the customer station. Once at the customer station the cover will be opened such that the customer may access the items as well as receipts, instructions, promotional material or any other things which the service provider has placed in the interior area of the carrier for delivery to the customer. After the items have been taken by the customer, the customer will generally leave the customer station and the service provider is ready to service another customer.

Figure 6:
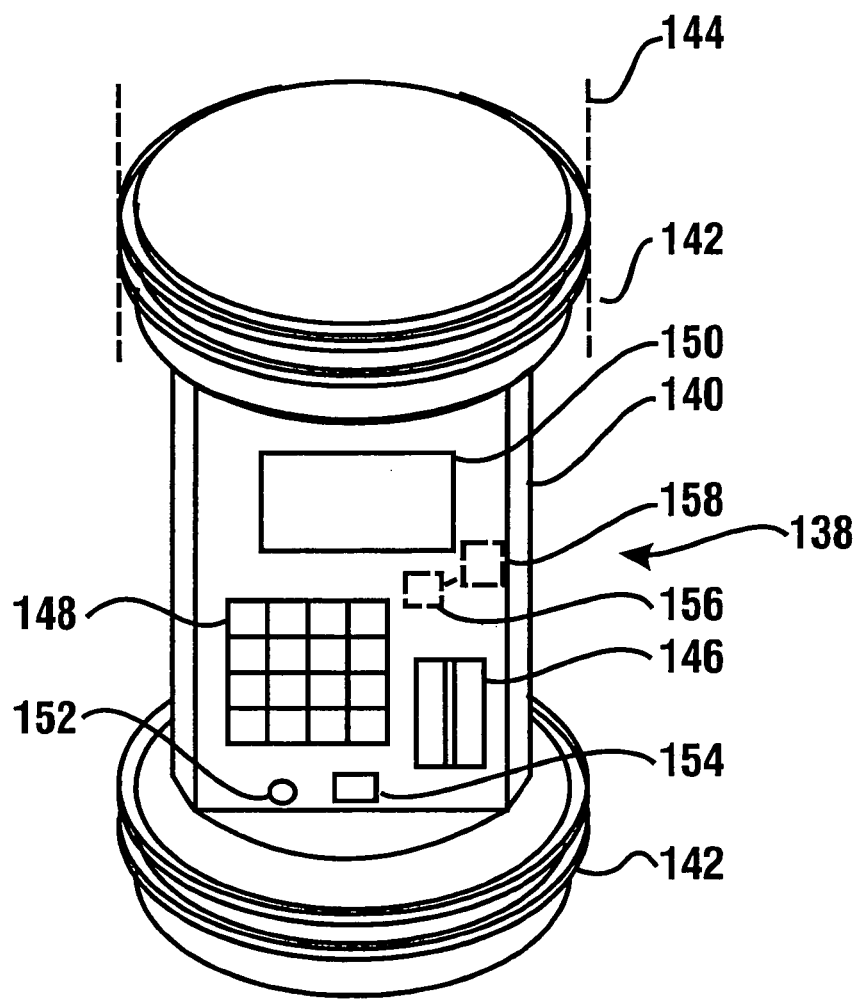
FIG. 6 is an isometric view of an alternative type carrier with an integral transaction data storage unit, which may be used in some embodiments.

Other alternative exemplary embodiments may include types of pneumatic transfer systems in which the carrier, which is transported between the service provider station and the customer station, may be removed from the transfer conduit. FIG. 6 shows an exemplary data transfer unit schematically indicated 138 which may be used in such an embodiment. Unit 138 includes a body 140. Body 140 includes annular seal rings 142 adjacent each end which enable slidable generally fluid tight engagement with the interior wall of a transfer tube which is schematically represented 144. Body 144 has in supporting connection therewith a card reader 146 and a keypad 148 including a plurality of keys. Body 140 also includes a display 150, an output device 152 and a reading device 154. Body 140 also has supported thereon a processor schematically indicated 156. The processor 156 is in operative connection with a memory schematically indicated 158.

The operation of the exemplary system which includes the unit 138 is generally similar to that previously described. The unit may be programmed with the amount due by the service provider at the service provider station through operation of the charge device. This can be accomplished for example, through the output device 62 delivering signals to the reading device 154 which indicates the charge amount. These may be for example, infrared signals or other types of radiation signals. Of course as previously discussed, other types of electrical or electronic signals including physical electrical connections may be used.

Once programmed with the amount data, the unit 138 may be placed in the transfer tube and transferred to the customer station. Because the customer is enabled to remove the unit from the transfer tube, the customer does not have to extend themselves through a window of their vehicle to swipe their card and/or provide a PIN input, or input other data to the unit. Rather, the customer may provide the necessary inputs within the confines of their vehicle in the drive-through lane adjacent to the customer station.

Once programmed with the information, the unit 138 may then be placed in the customer terminal by the customer and transported to the service provider terminal. At the service provider station, the service provider may remove the unit from the tube and receive the account information from the output device 152 so as to assess the charge to the customer account in a manner like that previously discussed. The successful assessment of the charge may also cause the charge device to output signals which are received by the carrier so as to erase the customer information from the memory.

In this alternative embodiment, because the carrier is removable from the tube, the service provider may deliver items to the customer through use of an alternative carrier. Such an alternative carrier is schematically indicated 160 in FIG. 4. The carrier 160 may be similar in configuration to the unit 138 but may include an interior area in which items may be stored and transferred between the customer and the service provider. As a result, the exemplary systems including the unit 138 may employ carriers only intended for transferring items in transactions where it is not necessary to receive account data from the customer. In those transactions where it is necessary to receive debit or credit card data, the other carrier may be removed from the system by the service provider and the unit 138 used to transfer the necessary account data. Of course it should be understood that unit 138 and its method of use are exemplary and in other embodiments other approaches may be used.

Figure 7:
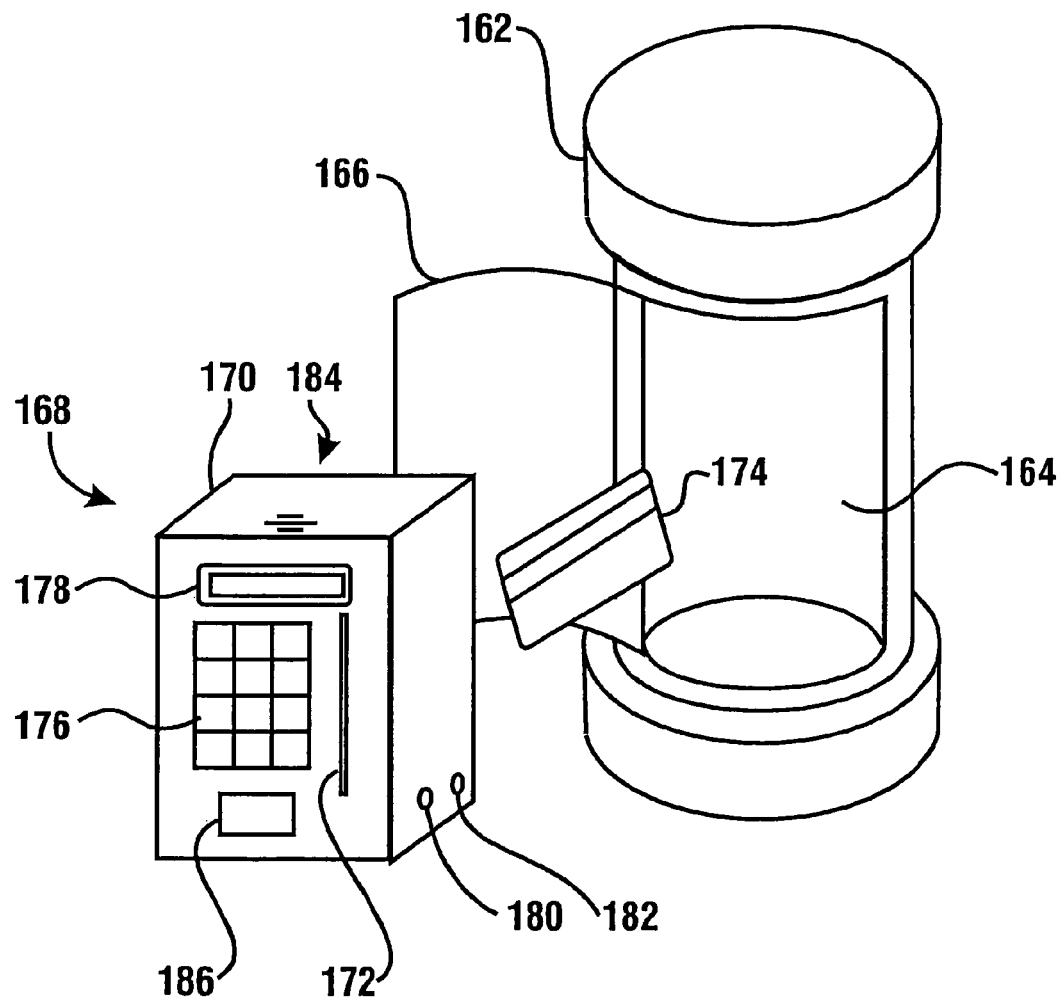
FIG. 7 is an isometric view of an alternative embodiment of a carrier and transaction data transfer unit that may be removably positioned in an interior area of a carrier or in an alternative device for transferring the unit between a customer and a service provider, such as a movable drawer.

FIG. 7 shows yet a further alternative embodiment of a data transfer unit which may be used to deliver account information from the customer to the service provider. FIG. 7 shows a carrier 162 of a type that is removable from the transfer conduit. Carrier 162 includes an interior area 164. Access to interior area 164 is controlled by removable cover 166.

A data transfer unit 168 is removably positionable in the interior area 164. In this embodiment the data transfer unit may be moved between the service provider and the customer in a manner similar to other items that are exchanged between the service provider and the customer. Unit 168 includes a body 170 sized to be removably positioned in the interior area 164. Body 170 includes in supporting connection therewith a card reader schematically indicated 172 for reading cards such as card 174 as shown. It should be understood that although card 174 shown is a magnetic stripe card, other embodiments may be capable of reading smart cards or other types of cards which include account information or data representative of monetary value.

Unit 168 further includes a keypad 176 including the plurality of keys and a display 178. Body 170 also has supported thereon an output device 180 and a reading device 182. It should be understood that body 170 further includes a processor and a memory and may be operated in a manner similar to that described in connection with other described embodiments.

Alternative embodiments may also include other types of input and output devices in addition to or different from those previously described. For example unit 168 may include audio output devices such as a speaker schematically indicated 184. Such an output device may be useful in providing instructions for operation of the device by persons who are visually impaired. In addition or in the alternative, unit 168 may include a device and appropriate programmed instructions to receive and interpret verbal inputs from users. Alternatively or in addition, unit 168 may include a device for reading biometric indicia such as fingerprint reader 186. In some embodiments biometric indicia may be received for purposes of identifying a particular user and/or their account. Such information may be received and stored by the unit and transferred to the charge device or other device at the service provider station. Such information may be used to verify that the transaction is authorized or that the user is a person who is authorized to charge amounts against a particular account. Alternatively or in addition, biometric inputs may be compared to data stored on a card or in other local or remote memory for purposes of determining the identity of the particular user and their authority to conduct the transaction. This may be appropriate for example when a user is receiving medical items which are narcotics through the system. In such cases the biometric inputs may be used to further verify that the individual is authorized to receive the narcotics and/or may assist in tracking unauthorized transactions. Further in some embodiments inputs such as biometric inputs or other inputs may be compared to data stored on the user's card for purposes of verifying that the user's card is being used by the authorized user. This data may be stored for example on a memory chip on a card and the verification may be accomplished through the processor in the portable unit. Of course these approaches are merely exemplary.

In alternative embodiments the portable unit may include other types of input devices suitable for accepting inputs from the user. For example, the unit may include a reader for reading other types of identifying items indicating how amounts are to be charged. This may include for example, readers for bar codes, radio frequency identification (RFID) or other types of items or signals bearing identifying indicia. As a result the portable unit may be used for reading items such as benefit plan cards or hospital ID bands. Such items may be used to communicate information on how to assess charges, including charges to be assessed to third parties. The information may be transmitted to the charge device and utilized for purposes of assessing appropriate charges, tracking medication use, or other purposes.

The operation of the unit 168 shown in FIG. 7 in connection with the transaction system may be generally similar to that previously described. A further advantage of the unit 168 shown in FIG. 7 is that the unit may also be provided to customers other than by delivery through the pneumatic tube conduit. For example unit 168 may be passed to a customer through the opening in the wall 16 by extending and retracting the movable deal drawer 20. In this way a customer located at customer station 21 may use the unit 168 to provide card and/or PIN data for purposes of carrying out transactions with the service provider.

In alternative embodiments the carrier or other unit may also serve to perform other functions. For example, memory in the portable unit may be used to hold .wav files or other data that can be used to provide audio outputs. Such audio outputs may be used to provide the user with instructions for use of the items delivered. For example, audio instructions may be associated in a database in the establishment with an item being provided to the user. As a result when the item is indicated as being sold through the charge device, or in response to other inputs such as scanning a bar code on the item, a computer in the establishment operates to cause the data to produce the audio instructions to be loaded into the memory of the portable unit. Thereafter when the user is to receive the items, such as in a carrier, or at another time, the audio instructions may be output through a speaker on the carrier or other connected speaker. Alternatively such instructions may be provided by a pharmacist for the particular user or for the particular items. The pharmacists's instructions may be stored as data and transferred to the memory in the carrier or other unit from which they are output to the user. In some embodiments the processor may be programmed to enable a user after receipt of the instructions to repeat them by providing one or more inputs. Of course these approaches are exemplary and in other embodiments other approaches may be used.

In some alternative embodiments the portable unit may also be utilized to perform other functions. For example, persons may carry medical history data on a card or other device. The portable unit may include a suitable card reader or other input device for receiving such data. Such information may be transmitted to the provider of the item who can input such data into a computer system that looks for allergies or possible instructions with the items currently being provided to the user. In this way the provider of the item can reduce the risks of such problems with the items being provided. Additionally, the portable unit may include the capability for delivering data to supplement medical data on a card or other item bearing medical information about the user. For example the portable unit may be programmed to update the data stored on a user's medical history card. The user may update the data through a writer device on the portable unit by engaging the user's medical history card therewith. Of course these approaches are exemplary, and in other embodiments other approaches may be used.

Figure 11:
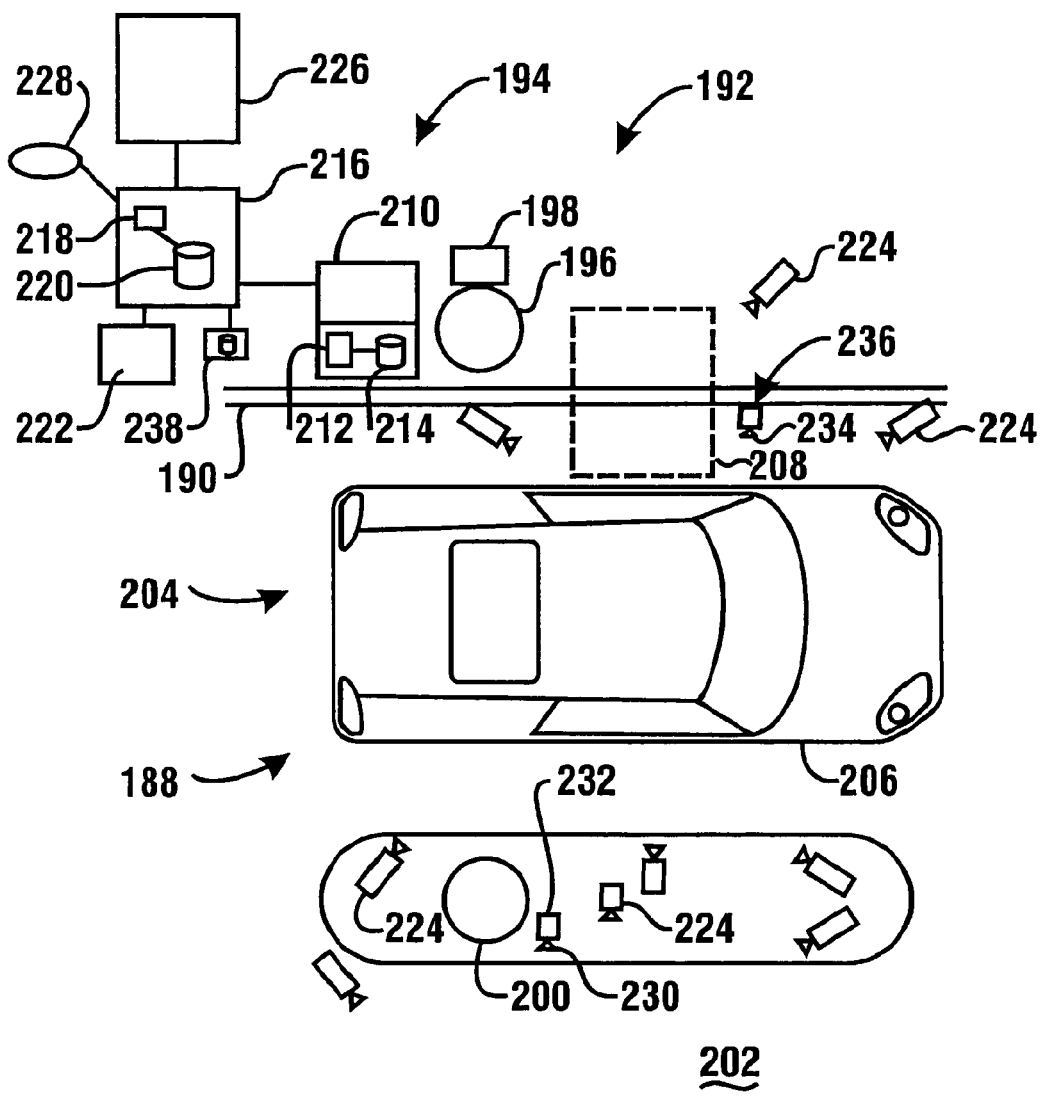
FIG. 11 is a top schematic view of an alternative form of an exemplary apparatus.

FIG. 11 shows a further alternative system generally referred to as 188. System 188 may include features like those previously discussed. In this exemplary system there is included a facility 190. For purposes of this exemplary description, the facility 190 will include a pharmacy of the type previously discussed. However, it should be understood that in other embodiments other facilities such as banking facilities, or facilities which provide goods or services to users, may be used.

Facility 190 includes an interior area 192. Interior area 192 includes a service provider station 194. The service provider station includes a service provider terminal 196. Service provider terminal 196 of this exemplary embodiment comprises a pneumatic carrier delivery and receiving device of the type previously described. The service provider terminal is in operative connection with a control panel 198 which is operative to receive inputs from a service provider for purposes of communicating with customers and causing a pneumatic carrier to move between the service provider terminal and a customer terminal 200. In this exemplary embodiment, customer terminal 200 is a transaction device which enables delivery and receiving of a pneumatic carrier of the types that have been described. Of course it should be understood that this type of transaction device is exemplary, and in other devices other types of transaction devices may be used. In this exemplary embodiment, the customer terminal 200 is positioned adjacent to a drive-through lane 202. Customers are enabled to move through the drive-through lane in their vehicles. When stopped at a position adjacent to the customer terminal 200, a customer in a vehicle is enabled to carry out transactions by communicating with and exchanging items with a service provider at the service provider station. Although it is not specifically shown, system 188 may include devices for audio communication between the service provider and the customer of the types previously described. This may include microphones and speakers adjacent to each station.

The exemplary system 188 further includes another drive-through lane 204. Vehicles are enabled to pass through drive-through lane 204, and an exemplary vehicle 206 is shown. A deal drawer 208 serves as a transaction device which can be used to exchange items with customers at a position adjacent the transaction device in the customer vehicle. Of course it should be understood that while in this exemplary embodiment a drive-through type transaction environment is shown, in other embodiments other types of transaction systems, such as walk up systems or other types of systems, may employ the principles described.

The exemplary embodiment further includes within the facility at least one computerized transaction device 210. Computerized transaction device 210 includes, as schematically indicated, a processor 212 which is in operative connection with at least one data store 214. The exemplary computerized transaction device may be a charge device providing some or all of the functions previously described, or may provide other or additional functions. The computerized transaction device of the exemplary embodiment is operative to record at least one data item that is associated with each transaction. This may include, for example in the exemplary pharmacy transaction environment, information about the prescription which is filled, the medications or other items provided to the user, information about the cost of the items, information about the manner in which payment is made, information about the account from which payment is made, and other or different information as may be pertinent to the transaction.

In the exemplary embodiment, the facility further includes therein at least one computer 216. Computer 216 includes at least one processor 218 which is in operative connection with at least one data store, schematically indicated 220. It should be understood that for purposes of this disclosure references to a computer shall be deemed to include references to a single computer as well as multiple computers. Likewise, a reference to a processor includes one or more processors. Likewise, a reference to a data store shall be deemed to include a single data store or multiple data stores.

The exemplary embodiment of the facility further includes a digital video recording device, schematically indicated 222. Device 222 may be a device that operates using the principles described in U.S. patent application Ser. No. 09/414,290 filed Oct. 7, 1999, which is incorporated herein by reference. Of course in other embodiments other types of digital recording devices may be used. In the exemplary embodiment, device 222 is operative to enable the recording of both image data as well as audio data that is associated with transactions. Device 222 is in operative connection with a plurality of cameras 224. Cameras 224 of the exemplary embodiment are operative to provide image data from a variety of points of view. This includes, for example, within the interior of the facility as well as externally of the facility and adjacent to the drive-through lane. Further in the exemplary embodiment, device 222 may be in operative connection with the control panel 198 including the microphones and speaker devices included therein so as to enable the recording thereof. Alternatively or in addition, the device 222 may be in operative connection with microphones positioned within and outside the facility for purposes of recording audio communications between the service provider and customers positioned adjacent to the transaction devices.

In still other embodiments, the device 222 may be in operative connection with cameras and audio receiving devices that are included on carriers or other items that are passed between customers and the service provider. This may include, for example, cameras and microphones that communicate wirelessly between the carrier and the device 222. Such a system may be used, for example, to record the playing of the audio outputs that are stored in the carrier to assure that a customer has received them. Alternatively or in addition, such cameras and microphones on the carrier may be used to further document the user verbal responses to questions from a service provider or a pharmacist. Alternatively or in addition, the recording of camera signals from the carrier may help to record the image of the user for purposes of documenting the transaction. Alternatively or in addition, if a fingerprint reader or other biometric input device is included on a carrier, inputs to such a device may also be converted to data which is captured through operation of the device 222. Of course these approaches are exemplary.

In still other embodiments, the device 222 may be in operative connection with systems of the type described in the incorporated disclosures of U.S. Pat. No. 6,711,460 and/or U.S. patent application Ser. No. 10/805,149 filed Mar. 19, 2004. The device 222 may be operative to record visual and audio signals associated with the preparation of pharmacy items by robotic devices or persons at the pharmacy. Alternatively or in addition, the device 222 may be operative to record video and audio communications between customers and pharmacists. This may include communications with pharmacists located at the facility or pharmacists or other professionals such as a physician communicating with the facility through remote communications. The delivery of the items, receipt of cash, and other transaction steps may also be included in captured image data and audio data, and stored through operation of the device 222. Of course it should be understood that these approaches are exemplary.

It should also be pointed out that, although the exemplary system is described in connection with activities that are conducted in a pharmacy, other embodiments may be used in connection with banking and/or other types of transaction environments.

In the exemplary system 188, the at least one computer 216 is in operative connection with output devices schematically indicated 226. Output devices 226 of the exemplary embodiment includes devices which can provide reports of desired information. Such desired information may be output through visual displays, printers or other types of output devices from which information may be perceived. Further, in some embodiments the at least one computer 216 may be in operative connection with one or more networks 228. The one or more networks may comprise local area networks or wide area networks of a public or private type to enable the data stored through operation of the system to be sent to and/or analyzed by authorized computers at other facilities.

The exemplary system 188 further includes a vehicle sensor 230. Vehicle sensor 230 is operative to sense a vehicle in a position adjacent to the transaction device 200 in the drive-through lane 202. The vehicle sensor 230 of the exemplary embodiment may be of a suitable type, such as an ultrasonic sensor, a photoelectric sensor, an inductance sensor, a reflectance sensor, a weight sensor or other sensor that can detect a vehicle in the position. Vehicle sensor 230 of the exemplary embodiment includes a communication device 232. Communication device 232 may comprise a suitable device for communicating signals from the vehicle sensor to remotely indicate the presence of a vehicle in the position adjacent the transaction device. Suitable communication devices may include, for example, a local area network interface card or an X10 interface which communicates through electrical wiring. In other embodiments the communication device may comprise a wireless communication device. Such wireless communication devices may include transmitters and/or transceivers that communicate via radio frequency (RF), infrared (IR) or other suitable wireless signals. Of course these approaches are exemplary.

The system 188 further includes a further vehicle sensor 234 and a further communication device 236 operative to sense a vehicle in the position in the drive-through lane 204. Vehicle sensor 234 and communication device 236 may be the same as or different from vehicle sensor 230 and communication device 232. Of course these approaches are exemplary.

Signals from the vehicle sensors and the communication devices are received by at least one receiving device 238. Receiving device 238 is operative to receive one or more signals from each of the communication devices, and to communicate with the at least one processor 218 in the computer 216. The computer 216 executes instructions stored in the at least one data store 220 to carry out certain desirable functions which may be useful in documenting activities that are carried out through operation of the system.

Figure 12:
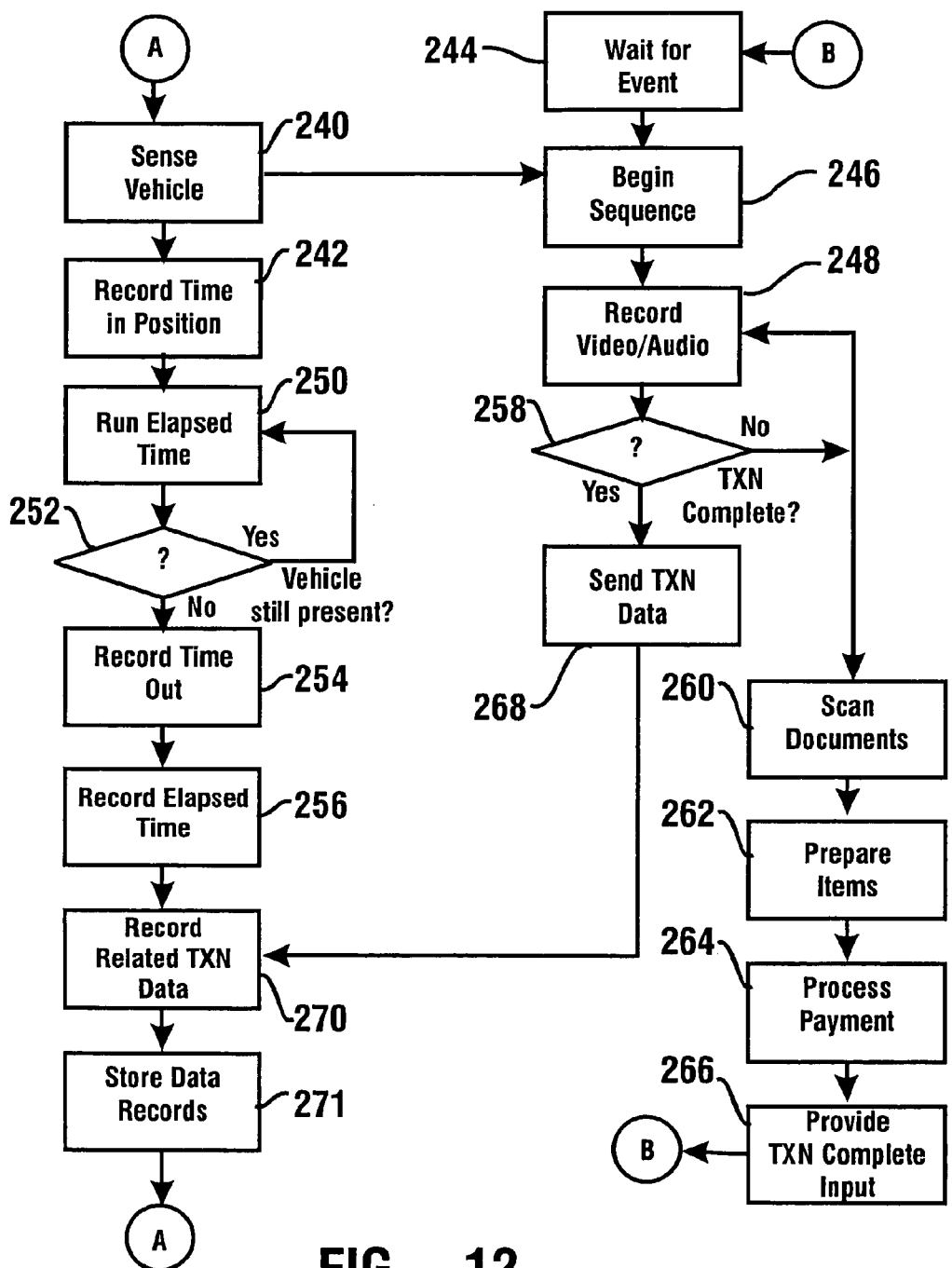
FIG. 12 is a schematic view of exemplary transaction steps carried out with the apparatus of FIG. 11.

FIG. 12 shows schematically an exemplary logic flow that is carried out through operation of the at least one computer 216 and the connected devices 220 and 210 of an exemplary embodiment. In the exemplary system, a receiving device 238 is operative to receive at least one signal indicating that a vehicle is in the position adjacent the transaction device in one of the drive-through lanes. This is represented by a step 240. In exemplary embodiments, step 240 may include the execution of one or more routines by the at least one computer to verify that the signals received in fact indicate a vehicle is present in one of the drive-through lanes, rather than an anomalous signal. Alternatively or in addition, the at least one computer 216 may execute instructions that are operative to verify that the signals correspond to a vehicle that is stopped in the position adjacent to a transaction device, rather than a vehicle or other item passing through the drive-through lane. The at least one computer may also operate, based on the signals, to resolve which of the drive-through lanes a particular vehicle is located in. Of course these approaches are exemplary.

Responsive to determining that a vehicle is in a position adjacent to a transaction device, the computer 216 is operative to record the time at which the vehicle enters the position. This is represented by a step 242.

In the exemplary embodiment, the at least one computer 216 is also operative to communicate with the digital video recorder device 222 and to indicate that a vehicle is in position. The digital video recorder device, which also includes at least one processor and at least one data store, changes from a state 244 in which it is waiting for a triggering event to a state 246 in which a triggering event has been indicated. This triggering event causes the device 222 to operate in a manner like that described in the incorporated disclosure to begin capturing data corresponding to images from selected cameras, such as cameras located at the service provider station as well as cameras with a field of view that includes the drive-through lane where the particular vehicle has been sensed. The triggering event may also cause the device to begin capturing data corresponding to audio signals as well. This is represented in a step 248.

The at least one computer 216, after recording the time in which the vehicle entered the position adjacent the transaction device, then operates an elapsed timer in a step 250. As represented in a step 252, the at least one computer continues to operate the elapsed timer until the vehicle is no longer sensed by the respective vehicle sensor as present at the position adjacent the transaction device.

When the vehicle is no longer sensed as present, the at least one processor in the computer 216 is operative to record the time at which the vehicle is no longer adjacent the transaction device. This is represented by a step 254. The at least one computer is also operative, responsive to the vehicle no longer being sensed, to record and resolve the elapsed time that the vehicle was in the position adjacent the transaction device. This is represented by step 256.

Before the vehicle leaves the position adjacent the respective vehicle sensor, the at least one device 222 continues to operate as represented in a step 258 to determine if the service provider has indicated that the transaction being carried out is complete. If there is no indication that the transaction is complete, the device 222 continues to operate in accordance with its programming to capture data corresponding to images and audio information. This is represented by step 248. In addition in the exemplary embodiment, the device 222 is operative to capture data associated with aspects of the transaction. This includes, for example, capturing images corresponding to scanned prescriptions that are provided to the service provider. This may be done, for example, by the service provider receiving a prescription from the user and the service provider scanning the written prescription through operation of at least one scanner in operative connection with the device 222 or other connected device. Alternatively or in addition, the prescription data may be accessed online and captured. This may be done through operation of online image capture tools and/or by a screen scraper. Alternatively or in addition, operation of a pharmacy in connection with systems of the type described in U.S. Pat. No. 6,711,460 may result in certain online documents being available. The capture of data corresponding to these documents is represented by a step 260.

In the exemplary embodiment the service provider, either directly or in conjunction with a local or remote pharmacist or a robotic device, may prepare and provide the pharmacy items or other items requested by the customer. The preparation of these items results in recording of data items associated therewith. Such data items may include image data associated with the compounding of medications, the counting of pills from storage areas, the preparation of packaging, the application of labels, the printing or recording of instructions, and/or other activities. The data items associated with such activities may be stored through operation of device 222 and/or the at least one computer 216. This is represented in FIG. 12 by a step 262.

In the exemplary embodiment the at least one transaction includes the processing of payments for the particular items or services that are delivered. In the exemplary embodiment this is done through operation of the computerized transaction device 210. The data recorded through operation of device 210, such as the item information, account number data and quantity data, may be transmitted to the device 222 and/or the at least one computer 216. Alternatively or in addition, data corresponding to images captured by the cameras, the carrier or other information related to the transaction and the processing of payment may be captured and stored. This is represented by a step 264.

After the processing of payment, the service provider is operative to provide at least one input through at least one input device to indicate that the transaction is complete. This is represented by a step 266. In the exemplary embodiment, such an input may be provided through the at least one computerized transaction device. Of course this approach is exemplary.

It should be understood that although the functions described in connection with steps 260, 262, and/or 264 are discussed as being carried out by certain of the devices including processors and data stores which are present within the facility, these approaches are merely exemplary. In other embodiments a single computer or multiple computers in various locations may carry out selected functions of the types that have been described. Further, other systems of embodiments may carry out additional functions related to the fulfillment of transactions of the type that are being conducted at the facility.

In the exemplary embodiment in step 258, the indication from the service provider that the transaction is complete causes the device 222 to send the captured transaction data to the at least one computer 216. This is represented in a step 268. The at least one computer then operates in accordance with its programmed instructions to record the transaction data and associate the transaction data, time values and other information associated with the transaction as is appropriate for storage of the data records corresponding to the transaction in the at least one data store. This is represented in a step 270. The at least one computer then operates to store the associated records in the at least one data store, as represented by a step 271.

It will be appreciated that the at least one computer 216 causes the at least one processor therein to operate so as to produce records that correlate the one or more time values associated with the sensing of vehicles with at least one data item that is provided through the at least one computerized transaction device. This data is useful for purposes of analysis, and can be used for documenting transactions as well as making improvements in the overall operation of the system.

For example, the at least one computer 216 may operate in accordance with its programmed instructions to provide reports and outputs through one or more output devices 226. Such reports may include information that can be recovered from the data store in operative connection with the at least one computer or other devices connected in the system. For example, such reports may be used to document the events that occurred in transactions and/or the person who was involved in a particular transaction. Such information may also be used to determine the length of time that a vehicle was present at a position adjacent to the transaction device, as well as the events which occurred during such time. Such information may be used to help to improve efficiencies by studying the transaction information. Further, as will be appreciated, embodiments may be used to minimize the risk of fraud and the improper use of medications. Of course these approaches are merely exemplary.

Figure 13:
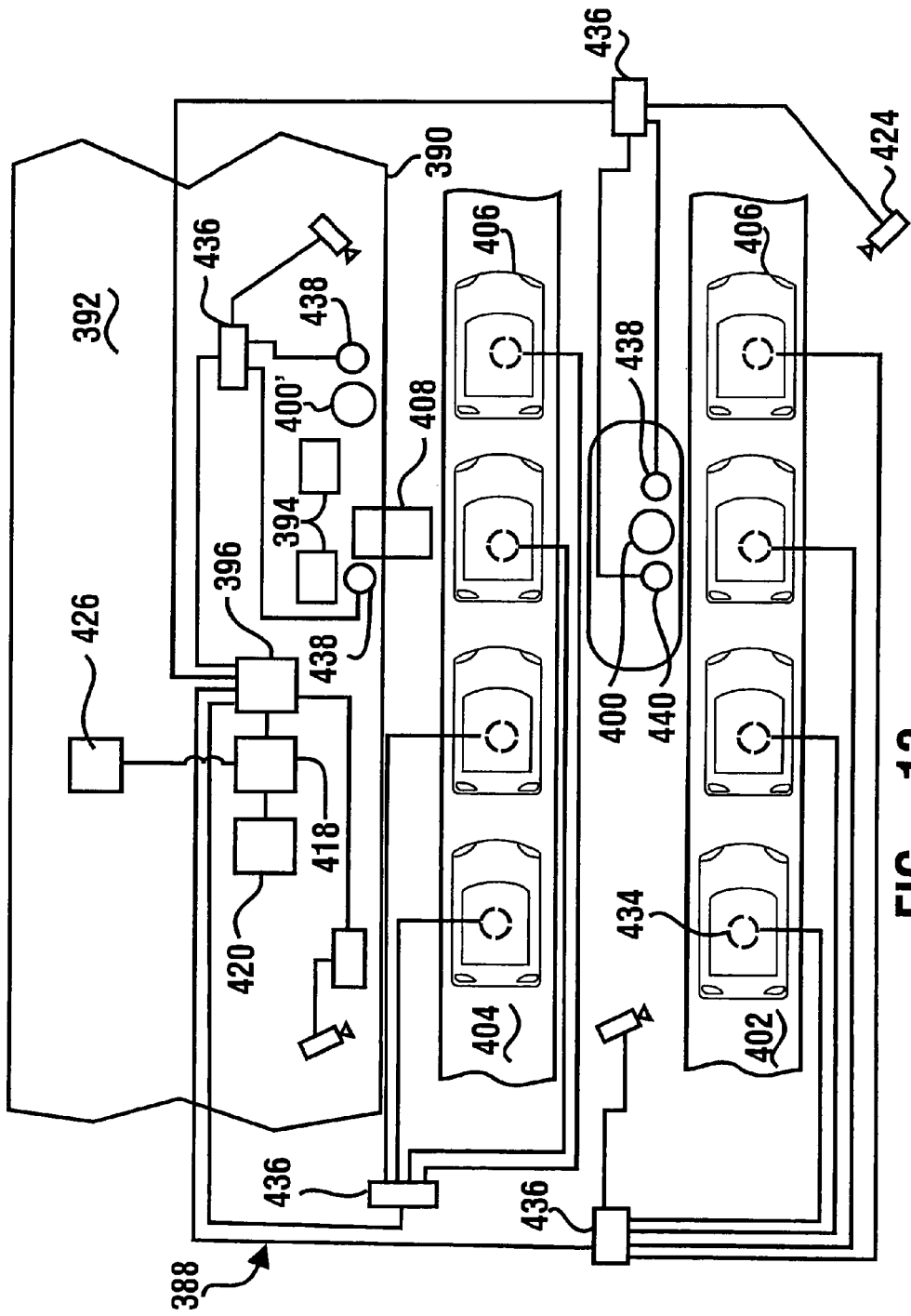
FIG. 13 is a schematic view of an alternative form of an exemplary system.

Referring now to FIG. 13, an alternative exemplary embodiment is shown of a system 388 comprising a facility 390 adapted to accomplish transactions. The facility 390 may, by way of example only, be a pharmacy or a bank or any of a wide variety of commercial venues which provide goods and/or services to persons by way of at least one drive-through or through lane 402, 404. Thus, vehicles 406, including automobiles and trucks, as well as persons on bicycles or motorcycles, or even on individuals on foot, may engage in transactions with service providers at a service provider station 394 within an interior 392 of the facility.

In the exemplary embodiment shown in FIG. 13, the interior 392 of the facility 390 includes a telephone system 396. Exemplary telephone systems 396 include, but are not limited to, a Private Branch eXchange (PBX), also known as a Private Business eXchange or Private Automatic Branch eXchange (PABX). Such systems are known in the art and have the capability of providing a variety of telephone features within the commercial business enterprise. Also included are at least one processor 418 in operative connection with at least one data store 420 and in operative connection with the telephone system 396. The processor 418 is in further operative connection to at least one output device 426. As will be appreciated, the processor 418 may be a computer or other apparatus capable of manipulating data according to a list of instructions, and the processor 418, the data store 420, and/or the output device 426 may comprise a portion of the telephone system 396. As it will also be appreciated in some embodiments, one or more processors may be embodied in each of the variety of sensors 434, 438, 440. Further, the output device 426 may include, by way of example only, a further processor, a computer screen, a digital storage device such as a hard drive, optical disk storage media such as a compact disk (CD) or digital versatile disk (DVD), or solid state drives such as flash drives. Such output devices 426 may be local to the facility 390 or remote. Of course these approaches are exemplary.

Further included in the exemplary system 388 shown in FIG. 13 is at least one transaction device 400, 400', 408 through which items are exchanged between a service provider (not shown) at a service provider station 394 within the interior 392 of the facility and a person (not shown) in a vehicle 406 at a position in the through lane 402, 404 adjacent the transaction device 400, 408. Various types of transaction devices 400, 400', 408 may be utilized. For example, a deal drawer 408 may be utilized when engaging in a transaction with a person in a vehicle 406 in the at least one through lane 404 adjacent to the interior 392 of the facility 390. Alternatively, by way of example only, a person in a vehicle 406 in the through lane 402 may exchange items with a service provider within the interior 392 of the facility 390 via a pneumatic tube transaction device 400, 400'.

Still further included in the exemplary system 388 shown in FIG. 13 may be at least one transaction initiator (not shown) which may include, by way of example only, a "CALL" button by which the service provider may be alerted to the need to provide service to a person in a vehicle 406.

Still further included in the exemplary system 388 shown in FIG. 13 is at least one vehicle sensor 434. The vehicle sensor 434 is adapted to sense the presence of a vehicle 406 at a position in the through lane 402, 404. The vehicle sensor 434 may comprise, by way of example only, an inductive sensor, a load sensor, a laser, infrared, or other light beam sensor, or, by way of a video camera 424, visual recognition. Such vehicle sensors 434, when appropriately placed, are capable of sensing a variety of data regarding the position of a vehicle 406 in the through lanes 402, 404. In some exemplary systems, it may be desirable to detect the arrival of a vehicle 406 at an entrance to a through lane 402, 404, the arrival of a vehicle 406 at a position adjacent to the transaction device 400, 408, the departure of a vehicle 406 from the position adjacent to the transaction device, the arrival of a vehicle 406 at a position at an exit from the through lane 402, 404, and the departure of a vehicle 406 from the position at the exit from the through lane 402, 404. Of course these sensing locations are exemplary.

Optionally included in the exemplary system 388 shown in FIG. 13 is at least one transaction sensor 438 associated with the transaction device 400, 400', 408. Such transaction sensor 438 is adapted to sense events occurring during the transaction. In some embodiments a transaction sensor may be operative to sense the presence or movement of one or more device components or one or more signals that correspond to item exchange between the service provider and the customer. For example, one or more sensors may sense when the service provider responds to a transaction initiation, when the deal drawer 408 is extended toward the person in the vehicle 406 or withdrawn toward the service provider within the interior 392 of the facility 390, or when a item is sent via the pneumatic transaction device 400, 400' or returned to the service provider. Of course these events that are sensed are merely exemplary.

Further optionally included in the exemplary system 388 shown in FIG. 13 is at least one transaction initiation sensor 440, 440' associated with a transaction initiator (not shown) such as a "CALL" button which would be activated by the person in the vehicle 406 or the opening of a circuit to enable voice communication which would be activated by the service provider. Such transaction initiation sensor 440, 440' is adapted to sense, for example, signals generated by a switch or other device that are generated responsive to the depressing of the "CALL" button alerting the service provider to the presence of a person desiring to engage in a transaction or the initiation or acknowledgement by the service provider.

Importantly, the exemplary system 388 shown in FIG. 13 comprises at least one telephone switching interface device 436 in operative connection with at least one sensor 424, 434, 438, 440. The telephone switching interface device 436 is further in operative connection with the telephone system 396 and the processor 418. Thus, the at least one sensor 424, 434, 438, 440 is in operative connection with the processor 418. The operative connection between the telephone system 393 and the telephone switching interface device 436, may, as an example only, be effected via conventional telephone wires and conductor jacks such as type RJ-11. The telephone switching interface device 436 is operative, responsive to a signal from the at least one sensor 424, 434, 438, 440, to establish communication with the telephone system 393 using, for example dual-tone multi-frequency (DTMF) signals. In an exemplary embodiment, the telephone switching interface device 436 is a PBX interface device. Thus, numerous events associated with transactions at the facility 390 may be sensed and communicated to the processor 418 via conventional telephone lines.

The processor 418 of the exemplary embodiment is operative to determine at least one time value corresponding to events associated with transactions at the facility 390 and store such in the data store 420. Further, such data may be made available to one or more output devices 426. The processor 418 may be further operative, to determine, by way of example only, system metrics such as total vehicles 406, the wait time from entering the through lane 402, 404 to reaching the transaction device 400, 408, the wait time from requesting service with the transaction initiator to response by the service provider, the total time a vehicle 406 is at the transaction device 400, 408, and delay caused by a blocking vehicle 406 stopped at the exit from the through lane 402, 404. Finally, the processor 418, or other processor, may be operative to model, using, for example, discrete event simulation, the system 388, thus enabling alteration and improvement of the operation of the system 388 or the facility 390.

Figure 14:
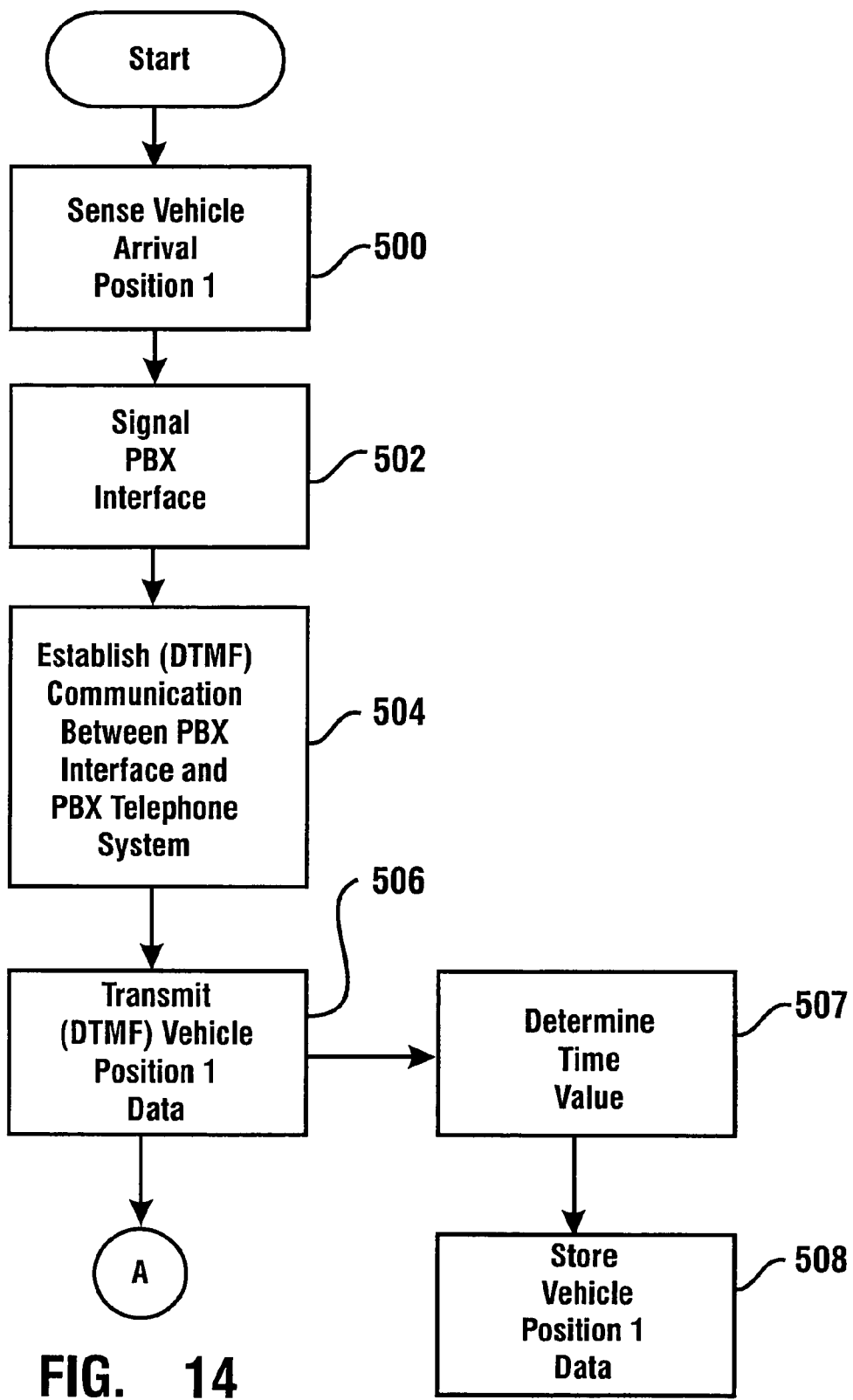
FIGS. 14 through 21 are schematic views of steps which are conducted through operation of an exemplary system.

Exemplary operation of the system 388 can best be understood by reference to FIGS. 14 through 23, in addition to FIG. 13. The arrival of a vehicle 406 at an entrance (nominally, Position 1, FIG. 14, Step 500) to the through lane 402, 404 is sensed by a vehicle sensor 434. (FIG. 14, Step 500.) The vehicle sensor 434 communicates a signal corresponding to the arrival of the vehicle 406 at the entrance to a through lane 402, 404 to the telephone switching interface device 436. (FIG. 14, Step 502.) The telephone switching interface device 436 establishes communication between the telephone switching interface device 436 and the telephone system 396. (FIG. 14, Step 504.) The telephone switching interface device 436 communicates to the processor 418 at least one signal corresponding to the arrival of the vehicle 406 at the entrance to the through lane 402, 404. (FIG. 14, Step 506.) For example, the signal may comprise a through lane 402, 404 identifier (e.g., 101) and a position identifier (e.g., 001). The processor 418 determines a time value (FIG. 14, Step 507) associated with the signal corresponding to the arrival of the vehicle 406 at the entrance to the through lane 402, 404 and stores the data corresponding to the time value in the data store 420 (e.g., 01001 mmddyyyhhmmss). (FIG. 14, Step 508.)

Figure 15:
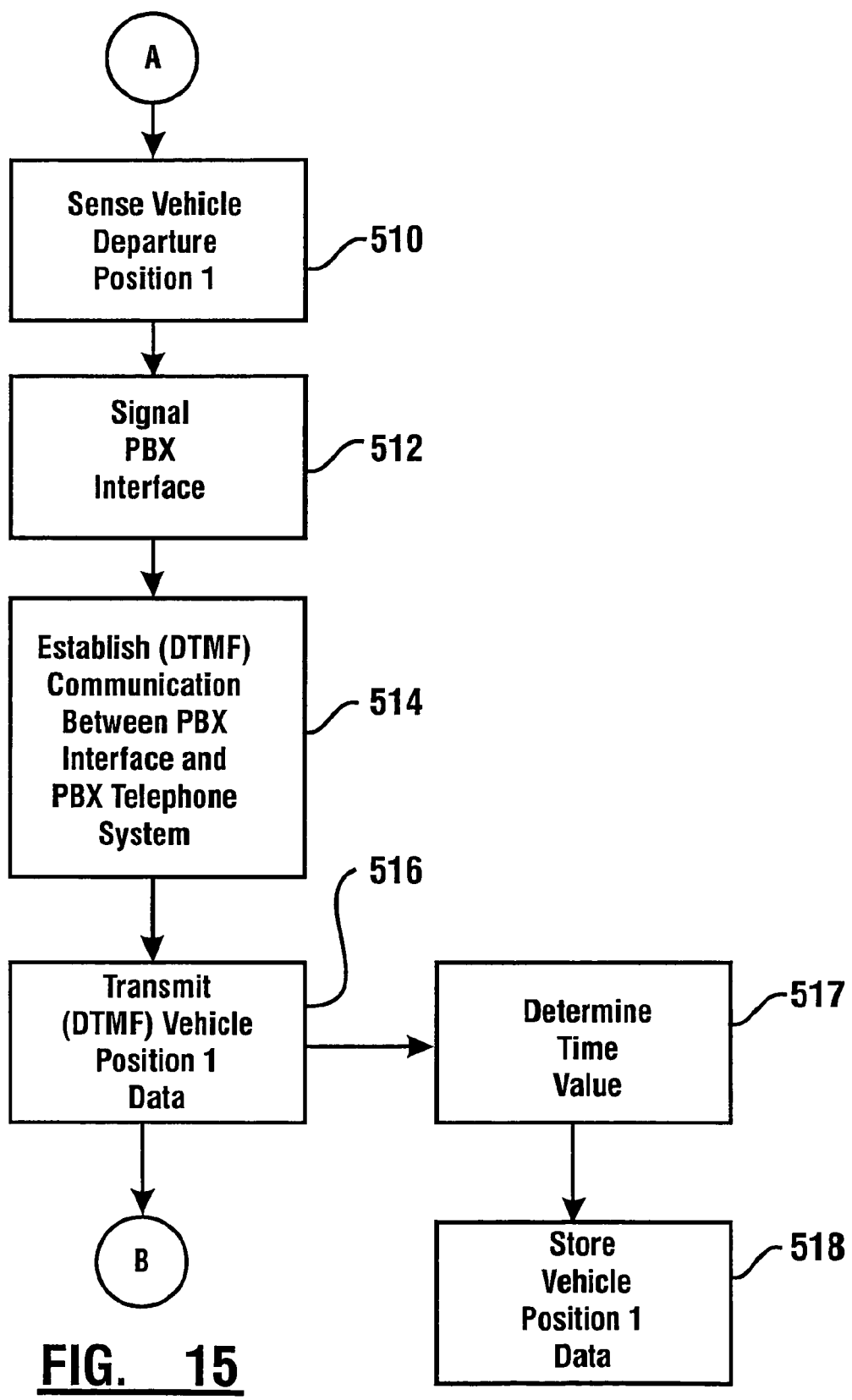

In an exemplary embodiment departure of the vehicle 406 from the entrance to the through lane 402, 404 is likewise sensed by the vehicle sensor 434. (Position 1, FIG. 15, Step 510.) Similar to the steps outlined in FIG. 14, the vehicle sensor 434 communicates a signal corresponding to the departure of the vehicle 406 from the entrance to the through lane 402, 404 to the telephone switching interface device 436 (FIG. 15, Step 512). The telephone switching interface device 436 establishes communication between the telephone switching interface device 436 and the telephone system 396 (FIG. 15, Step 514). The telephone switching interface device 436 communicates to the processor 418 a signal corresponding to the departure of the vehicle 406 from the entrance to the through lane 402, 404 (FIG. 15, Step 516), and the processor 418 determines a time value (FIG. 15, Step 517) associated with the signal corresponding to the departure of the vehicle 406 from the entrance to the through lane 402, 404 and stores the data in the data store 420 (FIG. 15, Step 518). As will be appreciated by those skilled in the art, communication between the telephone switching interface device 436 and the telephone system 396 may not have to be reestablished if communication has not been terminated.

Figure 16:
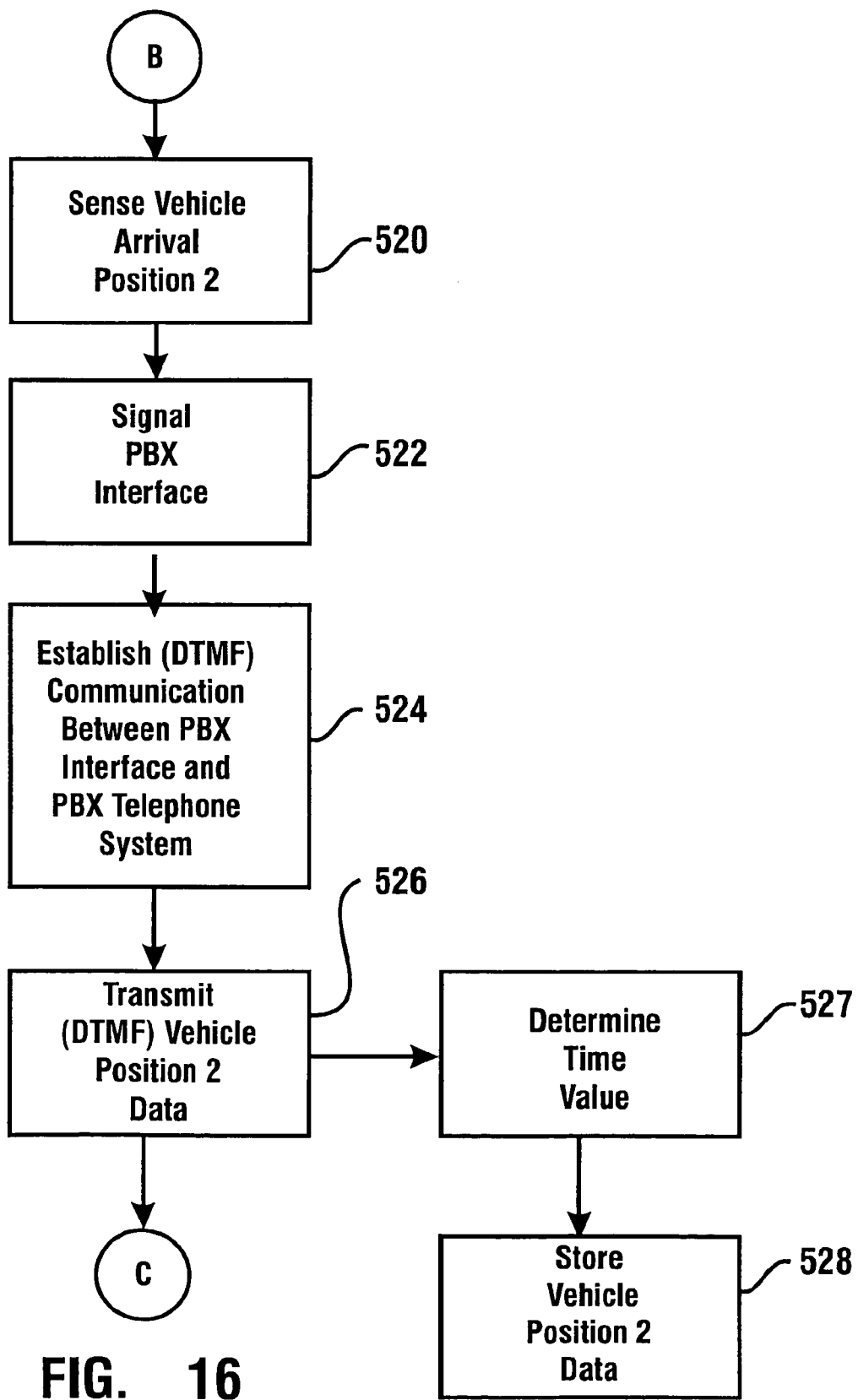

Similarly, in the exemplary embodiment the arrival of a vehicle 406 at the position adjacent the transaction device 400, 408 (nominally, Position 2, FIG. 16, Step 520) in the through lane 402, 404 is sensed by the vehicle sensor 434. (FIG. 16, Step 520.) The vehicle sensor 434 communicates a signal corresponding to the arrival of the vehicle 406 at the position adjacent the transaction device 400, 408 to the telephone switching interface device 436. (FIG. 16, Step 522.) The telephone switching interface device 436 establishes communication between the telephone switching interface device 436 and the telephone system 396. (FIG. 16, Step 524.) The telephone switching interface device 436 communicates to the processor 418 at least one signal corresponding to the arrival of the vehicle 406 at the position adjacent to the transaction device 400, 408. (FIG. 16, Step 526.) The processor 418 determines a time value (FIG. 16, Step 527) associated with the signal corresponding to the arrival of the vehicle 406 at the position adjacent the transaction device 400, 408 and stores the data corresponding to the time value in the data store 420. (FIG. 16, Step 528.)

Figure 17:
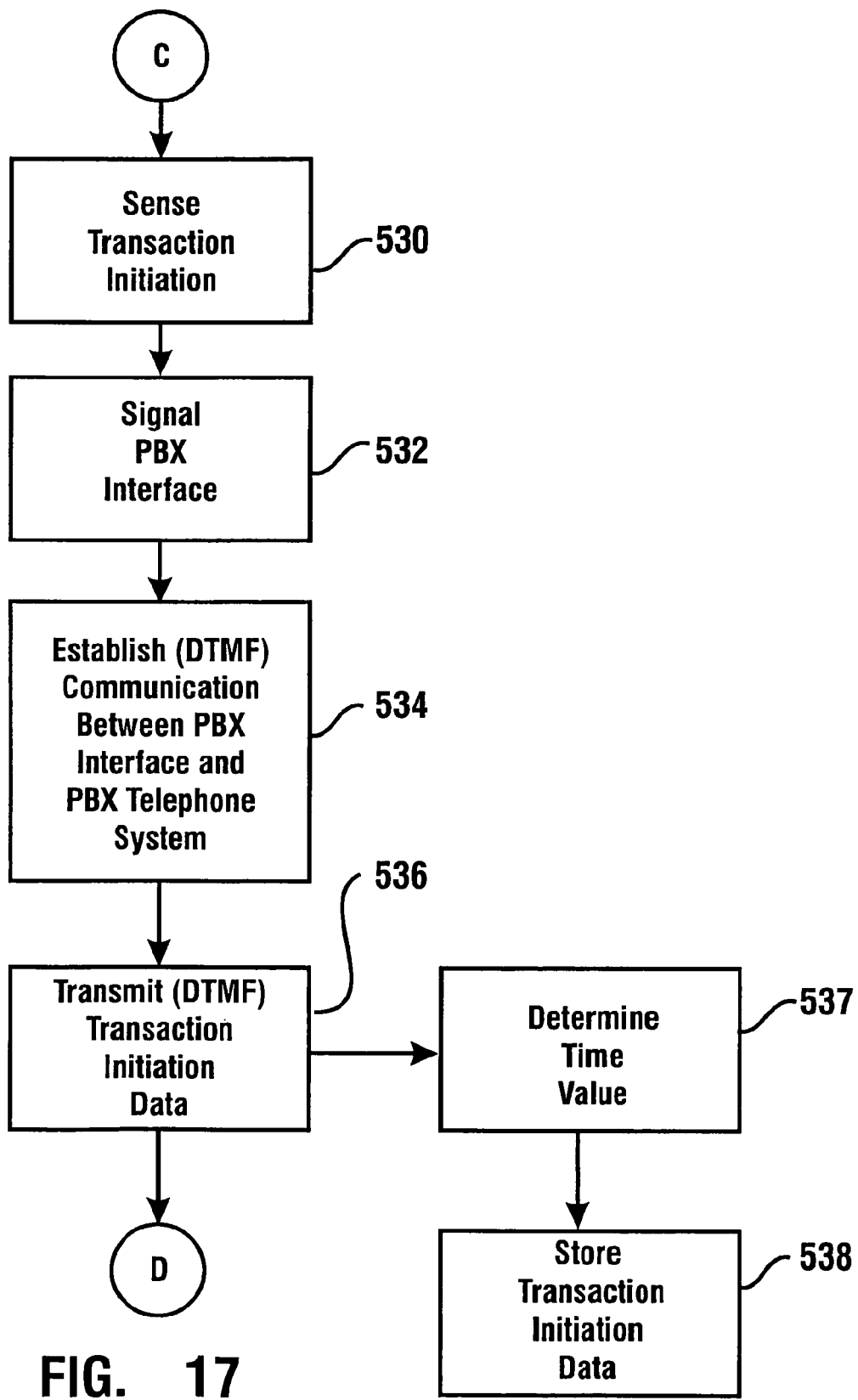

Upon arrival of the vehicle 406 at the position adjacent the transaction device 400, 408, the person in the vehicle 406 may press a "CALL" button to alert the service provider within the interior 392 of the facility 390. Such event is sensed by the transaction initiation sensor 440. (FIG. 17, Step 530.) The transaction initiation sensor 440 communicates a signal corresponding to the activation of the "CALL" button to the telephone switching interface device 436. (FIG. 17, Step 532.) The telephone switching interface device 436 establishes communication between the telephone switching interface device 436 and the telephone system 396. (FIG. 17, Step 534.) The telephone switching interface switching device 436 communicates to the processor 418 a signal corresponding to the activation of the "CALL" button. (FIG. 17, Step 536.) Alternatively, upon becoming aware of someone in need of service and before the person in the vehicle 406 presses the "CALL" button, the service provider may initiate the transaction by, for example, establishing voice communication. The processor 418 determines a time value (FIG. 17, Step 537) associated with the signal corresponding to the initiation of the transaction and stores the data corresponding to the time value in the data store 420. (FIG. 17, Step 538.)

Figure 18:
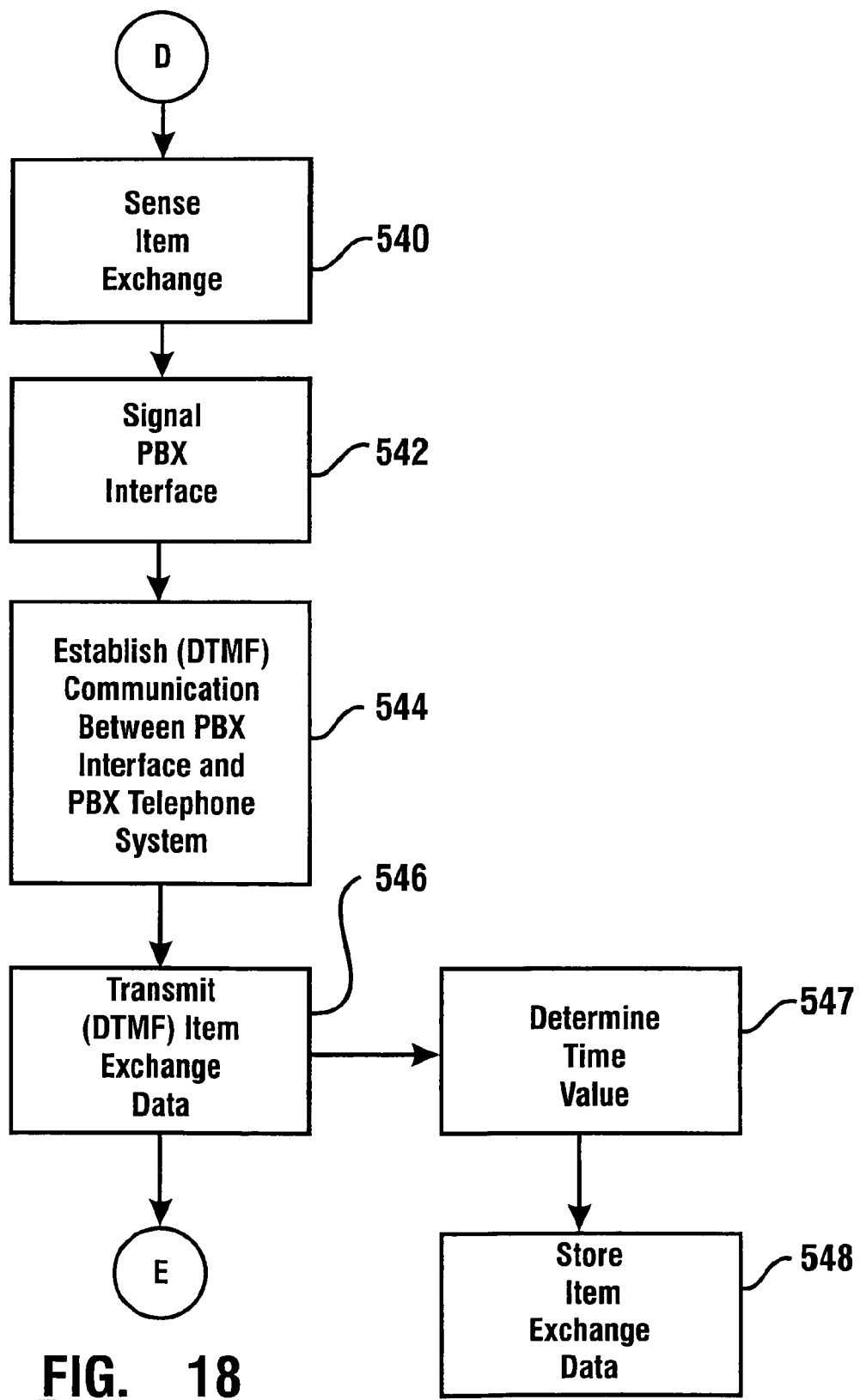

Turning now to FIG. 18, as the exemplary transaction proceeds, an event corresponding to the exchange of at least one item is sensed by the at least one transaction sensor 438. (FIG. 18, Step 540.) Such event may comprise, by way of example only, the placing of an item in a position preparatory to an exchange, the departure from the interior 392 of an item, the arrival of an item in a position preparatory to withdrawal from the transaction device 400, 400', 408, the removal of an item from the transaction device 400, 400', 408, or combinations thereof. The transaction sensor 438 senses a device component or signal related to such item or activity and communicates a signal corresponding to an event corresponding to the exchange of at least one item to the telephone switching interface device 436. (FIG. 18, Step 542.) The telephone switching interface device 436 establishes communication between the telephone switching interface device 436 and the telephone system 396. (FIG. 18, Step 544.) The telephone switching interface device 436 communicates to the processor 418 a signal corresponding to an event corresponding to the exchange of the at least one item. (FIG. 18, Step 546.) The processor 418 determines a time value (FIG. 18, Step 547) associated with the signal corresponding to an event corresponding to the exchange of the at least one item and stores the data in the data store 420. (FIG. 18, Step 548.)

Figure 19:
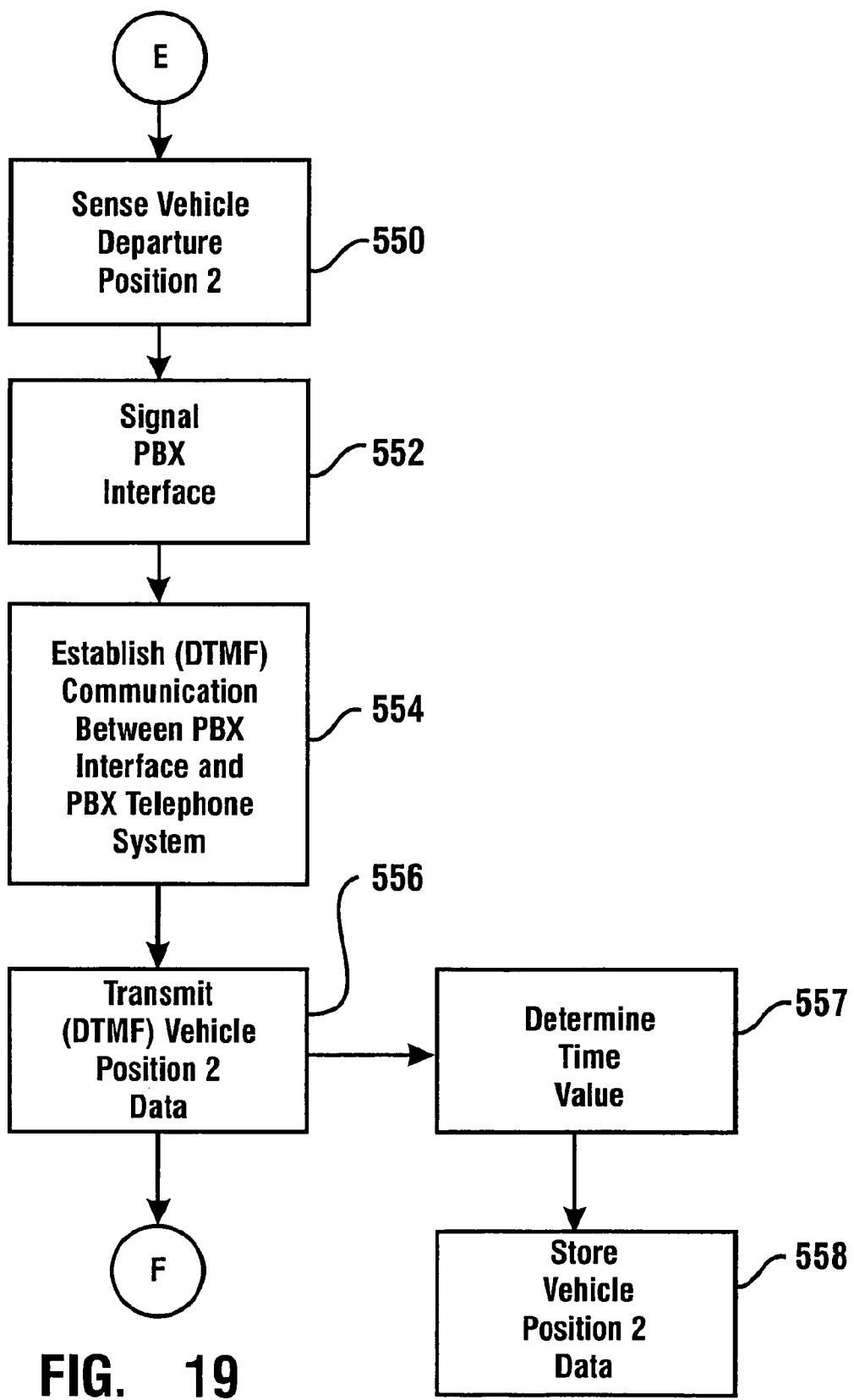

In the exemplary embodiment, departure of a vehicle 406 from the position adjacent the transaction device 400, 408 (Position 2, FIG. 19, Step 550) in the through lane 402, 404 is sensed by a vehicle sensor 434. (FIG. 19, Step 550.) Similar to the steps outlined in FIG. 15, the vehicle sensor 434 communicates a signal corresponding to the departure of the vehicle 406 from the position adjacent the transaction device 440, 408 to the telephone switching interface device 436 (FIG. 19, Step 552), the telephone switching interface device 436 establishes communication between the telephone switching interface device 436 and the telephone system 396 (FIG. 19, Step 554), the telephone switching interface device 436 communicates to the processor 418 a signal corresponding to the departure of the vehicle 406 from the position adjacent the transaction device 440, 408 (FIG. 19, Step 556), and the processor 418 determines a time value (FIG. 19, Step 557) associated with the signal corresponding to the departure of the vehicle 406 from the position adjacent the transaction device 440, 408 and stores the data corresponding to the time value in the data store 420 (FIG. 19, Step 558).

Figure 20:
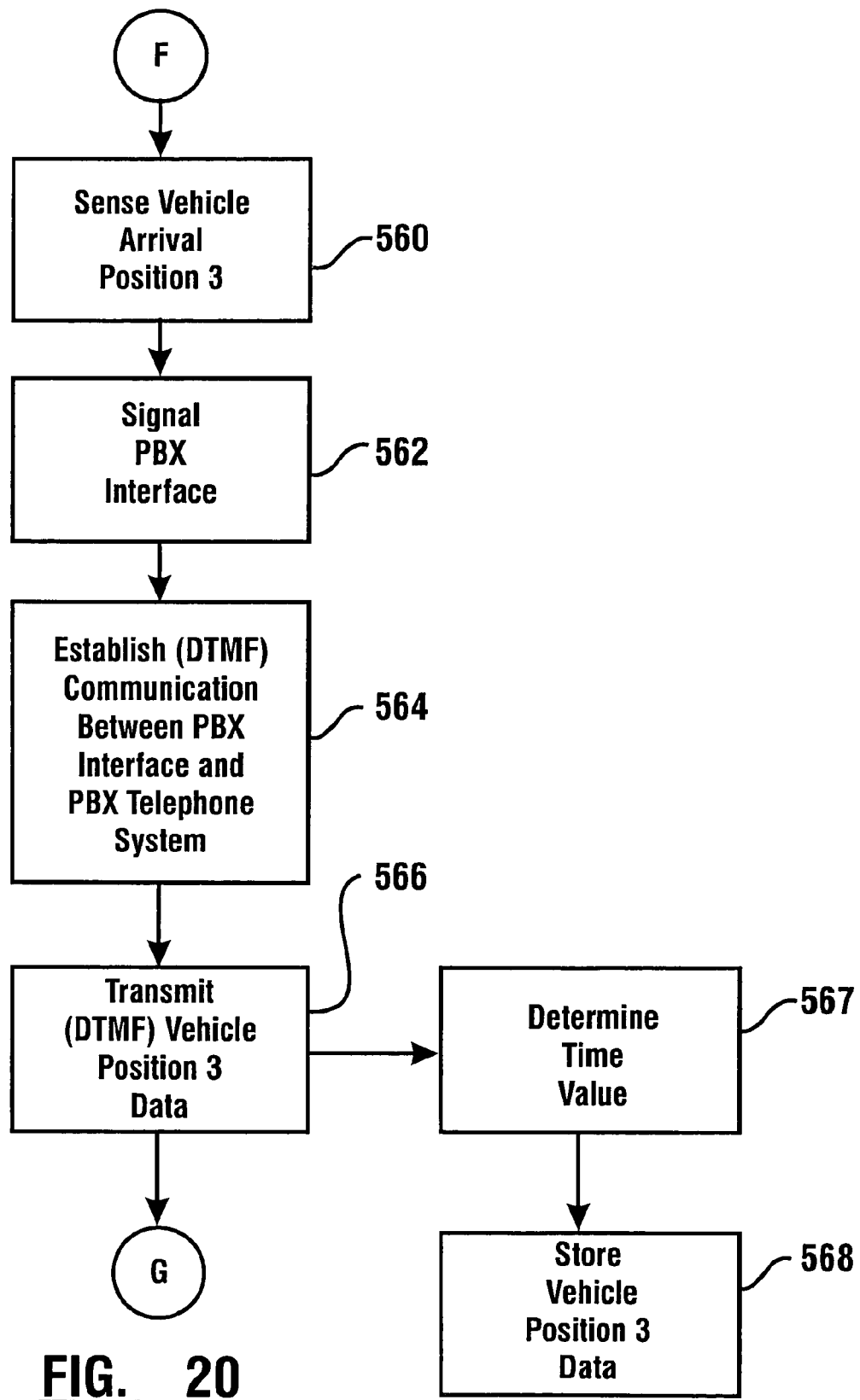

In the exemplary embodiment, arrival of a vehicle 406 at a position at an exit (nominally, Position 3, FIG. 20, Step 560) from the through lane 402, 404 is sensed by a vehicle sensor 434. (FIG. 20, Step 560.) The vehicle sensor 434 communicates a signal corresponding to the arrival of the vehicle 406 at the exit from a through lane 402, 404 to the telephone switching interface device 436. (FIG. 20, Step 562.) The telephone switching interface device 436 establishes communication between the telephone switching interface device 436 and the telephone system 396. (FIG. 20, Step 564.) The telephone switching interface device 436 communicates to the processor 418 a signal corresponding to the arrival of the vehicle 406 at the exit from the through lane 402, 404. (FIG. 20, Step 566.) The processor 418 determines a time value (FIG. 20, Step 567) associated with the signal corresponding to the arrival of the vehicle 406 at the exit from the through lane 402, 404 and stores the data corresponding to the time value in the data store 420. (FIG. 20, Step 568.)

Figure 21:
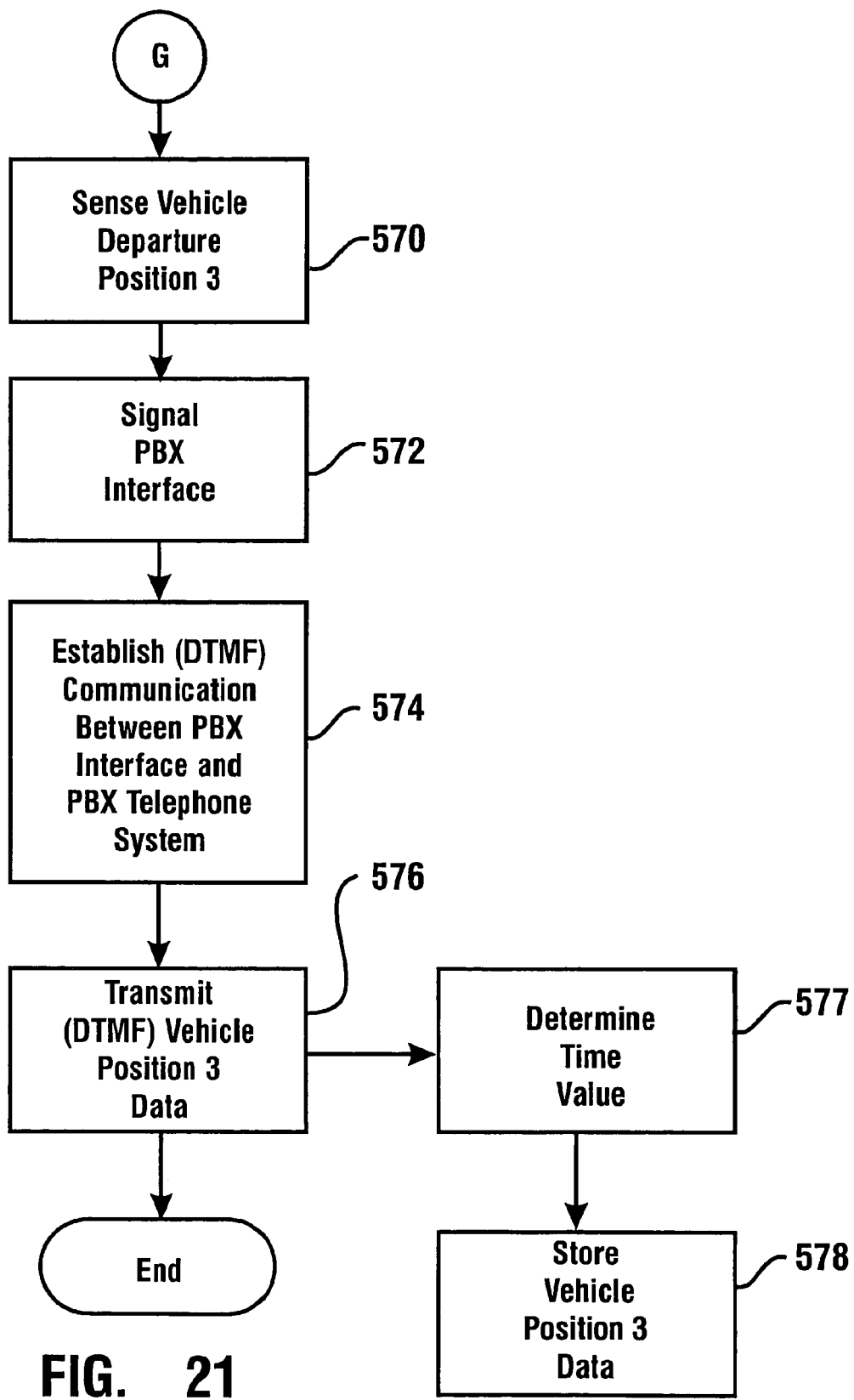

Similarly, in the exemplary embodiment the departure of the vehicle 406 from the position at the exit from the through lane 402, 404 is likewise sensed by the vehicle sensor 434. (FIG. 21, Step 570.) Similar to the steps outlined in FIG. 20, the vehicle sensor 434 communicates a signal corresponding to the departure of the vehicle 406 from the entrance to the through lane 402, 404 to the telephone switching interface device 436 (FIG. 21, Step 572). The telephone switching interface device 436 establishes communication between the telephone switching interface device 436 and the telephone system 396 (FIG. 21, Step 574). The telephone switching interface device 436 communicates to the processor 418 at least one signal corresponding to the departure of the vehicle 406 from the position at the exit from the through lane 402, 404 (FIG. 21, Step 576), and the processor 418 determines a time value (FIG. 21, Step 577) associated with the signal corresponding to the departure of the vehicle 406 from the position at the exit from the through lane 402, 404 and stores the data corresponding to the time value in the data store 420 (FIG. 21, Step 578).

Figure 22:
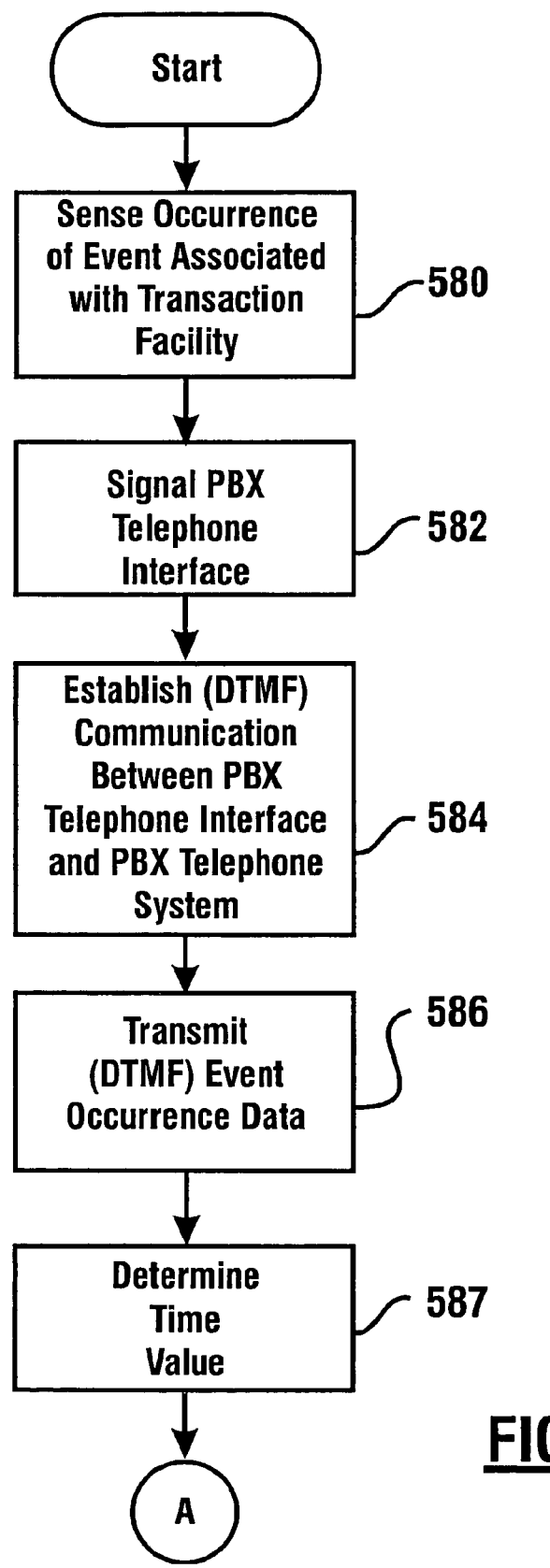
FIGS. 22 and 23 are schematic views of steps which are conducted through operation of an alternative form of an exemplary system.
Figure 23:
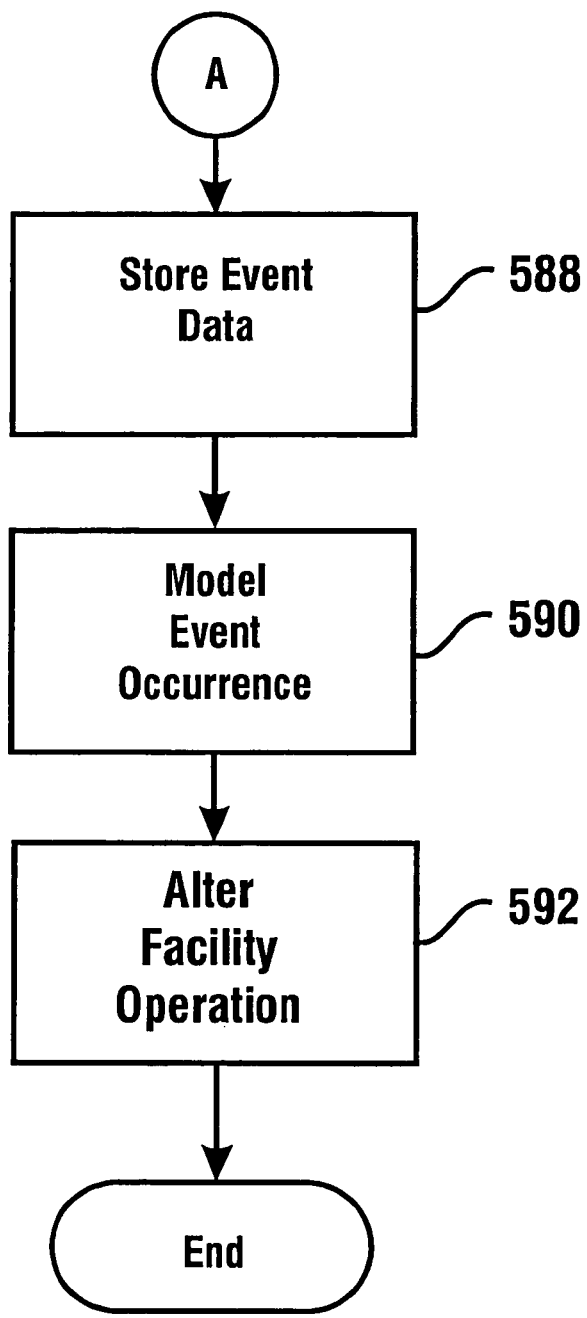

An alternative exemplary operation of the system 388 can be understood by reference to FIGS. 22 and 23, in addition to FIG. 13. An event associated with the operation of the facility 390 is sensed by at least one of a vehicle sensor 434, transaction sensor 438, transaction initiation sensor 440, or combinations thereof. (FIG. 22, Step 580.) The at least one sensor 434, 438, 440 communicates a signal corresponding to the event to the telephone switching interface device 436. (FIG. 22, Step 582.) The telephone switching interface device 436 establishes communication between the telephone switching interface device 436 and the telephone system 396. (FIG. 22, Step 584.) The telephone switching interface device 436 communicates to the processor 418 a signal corresponding to the event. (FIG. 22, Step 586.) The processor 418 determines a time value (FIG. 22, Step 587) associated with the signal corresponding to the event and stores the data in the data store 420. (FIG. 23, Step 588.)

Upon the acquisition of sufficient data associated with the operation of the facility 390, the operation of the facility 390 and the system 388 may be modeled using, for example, event analysis software and/or discrete event simulation software operating in a computer to evaluate the time-based behavior of the system 388. For example, it may be dynamically determined through operation of the event analysis software that additional service providers would be desirable at a particular time and the computer of the system may provide outputs through an output device indicating a need to shift service providers from other positions to the drive-through lanes, for example. Relative to a longer time horizon, the system 388 could be modeled through operation and appropriate software to evaluate the desirability of, for example, additional, or reconfigured drive-through lanes 402, 404 or higher speed transaction devices 400, 400', 408. Such event simulation software may include software which compares and correlates stored information regarding operation of the system and facility at different times, under different work flow conditions and during different types of transactions. Such software may also evaluate performance of service providers and/or the proficiency of service providers in different types of transactions. Such software may also facilitate making decisions related to operation of the facility, such as for example, times when additional staff are needed, when to open and close one or more drive-through lanes, when to purchase additional quantities of medications, amounts of cash to have on hand and other parameters. Of course these approaches are exemplary and in other embodiments other approaches may be used.

It should be understood that the devices and systems shown and the methods of operation described are exemplary. Embodiments may include other types of apparatus and methods.

Thus the exemplary apparatus and method described achieve at least some of the above-stated objectives, eliminate difficulties encountered in the use of prior devices and systems, solve problems and attain at least some of the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown or described.

Any feature of the invention that is described in the following claims as a means for performing a function shall be construed as encompassing any means known to those skilled in the art to be capable of performing the recited function and shall not be deemed limited to the means disclosed in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. A method of acquiring metrics at a facility adapted to accomplish transactions,
   wherein the facility includes:
   a telephone system,
   wherein the telephone system is operative to use dual-tone multi-frequency (DTMF) signals,
   at least one drive-through lane,
   at least one transaction device operative to exchange items with persons in vehicles in the at least one drive-through lane,
   at least one vehicle sensor operative to sense a vehicle at at least one position in the at least one drive-through lane,
   at least one telephone switching interface device in operative connection with the at least one vehicle sensor and the telephone system,
   wherein the at least one telephone switching interface device is operative to produce telephony communication signals that correspond to DTMF signals,
   at least one processor in operative connection with at least one data store and in operative connection with the at least one telephone switching interface device,
   wherein the at least one processor is operative to determine at least one characteristic associated with the vehicle at the at least one position,
   wherein the at least one processor is operative to cause a determined characteristic to be stored in the at least one data store,
   the method comprising:
   (a) operating the at least one vehicle sensor to sense a vehicle at a position in the at least one drive-through lane;
   (b) subsequent to step (a), operating the at least one vehicle sensor to communicate at least one signal associated with the vehicle sensed in step (a) to the at least one telephone switching interface device;
   (c) subsequent to step (b), operating the at least one telephone switching interface device to communicate at least one telephony communication signal associated with the vehicle sensed in step (a) to the telephone system,
   wherein the at least one telephony communication signal corresponds to at least one DTMF signal;
   (d) subsequent to step (c), operating the telephone system to communicate at least one signal associated with the vehicle sensed in step (a) to the at least one processor;
   (e) subsequent to step (d), determining at least one characteristic associated with the vehicle sensed in step (a) responsive to operation of the at least one processor; and
   (f) subsequent to step (e), storing in the at least one data store, responsive to operation of the at least one processor, the at least one characteristic determined in step (e).

2. The method according to claim 1 wherein the facility comprises a bank facility, wherein in step (a) includes operating at least one vehicle sensor to sense a vehicle at a position in a drive-through lane of the bank facility.

3. The method of claim 1 and further comprising:
   (g) sensing, with the at least one vehicle sensor, an arrival of the vehicle at an initial position at an entrance to the at least one drive-through lane;
   (h) communicating at least one signal corresponding to the arrival of the vehicle at the initial position at the entrance to the at least one drive-through lane, to the at least one telephone switching interface;
   (i) communicating at least one signal corresponding to the arrival of the vehicle at the initial position at the entrance to the at least one drive-through lane, to the telephone system;
   (j) communicating at least one signal corresponding to the arrival of the vehicle at the initial position at the entrance to the at least one drive-through lane, to the at least one processor;
   (k) determining responsive to operation of the at least one processor, at least one time value corresponding to the arrival of the vehicle at the initial position at the entrance to the at least one drive-through lane; and
   (l) storing, in the at least one data store, through operation of the at least one processor, data corresponding to the at least one time value, wherein the at least one time value corresponds to the arrival of the vehicle at the initial position at the entrance to the at least one drive-through lane.

4. The method of claim 1 and further comprising:
   (g) sensing, with the at least one vehicle sensor, an arrival of the vehicle at a position in the at least one drive-through lane adjacent the transaction device;
   (h) communicating at least one signal corresponding to the arrival of the vehicle at the position in the at least one drive-through lane adjacent the transaction device, to the at least one telephone switching interface;
   (i) communicating at least one signal corresponding to the arrival of the vehicle at the position in the at least one drive-through lane adjacent the transaction device, to the telephone system;
   (j) communicating at least one signal-corresponding to the arrival of the vehicle at the position in the at least one drive-through lane adjacent the transaction device, to the at least one processor;
   (k) determining at least one time value corresponding to the arrival of the vehicle at the position in the at least one through lane adjacent the transaction device; and
   (l) storing, in the at least one data store, through operation of the at least one processor, the at least one time value corresponding to the arrival of the vehicle at the position in the at least one drive-through lane adjacent the transaction device.

5. The method of claim 1 wherein the facility further includes
   at least one transaction initiation device operative to alert a service provider within the facility,
   at least one transaction initiation sensor operative to sense a transaction initiation,
   wherein the at least one telephone switching interface device is in operative connection with the at least one transaction initiation sensor, and
   wherein the at least one processor is operative to determine at least one transaction initiation time value corresponding to a transaction initiation sensing by the at least one transaction initiation sensor,
   wherein the at least one processor is operative to cause the at least one transaction initiation time value to be stored in the at least one data store,
   wherein the method further comprises:
   (g) sensing, through operation of the at least one transaction initiation sensor, a transaction initiation;
   (h) communicating at least one signal corresponding to the transaction initiation, to the at least one telephone switching interface;
   (i) communicating at least one signal corresponding to the transaction initiation, to the telephone system;

(j) communicating at least one signal corresponding to the transaction initiation, to the at least one processor;
(k) determining through operation of the at least one processor at least one transaction initiation time value corresponding to the transaction initiation; and
(l) storing, in the at least one data store, through operation of the at least one processor, the at least one transaction initiation time value.

6. The method of claim 1 wherein the facility further includes at least one transaction sensor operative to sense an item exchange,
   wherein the at least one telephone switching interface device is in operative connection with the at least one transaction sensor, and
   wherein the at least one processor is operative to determine at least one item exchange time value corresponding to an exchange of an item,
   wherein the at least one processor is operative to cause the at least one item exchange time value to be stored in the at least one data store,
   wherein the method further comprises:
   (g) sensing, through operation of the at least one transaction sensor, an item exchange;
   (h) communicating at least one signal corresponding to the item exchange, to the at least one telephone switching interface;
   (i) communicating at least one signal corresponding to the item exchange, from the at least one telephone switching interface to the telephone system;
   (j) communicating at least one signal corresponding to the item exchange, to the at least one processor;
   (k) determining through operation of the at least one processor at least one item exchange time value corresponding to the item exchange; and
   (l) storing, in the at least one data store, through operation of the at least one processor, the at least one item exchange time value.

7. The method of claim 1 and further comprising:
   (g) sensing, with the at least one vehicle sensor, a departure of the vehicle from a position in the at least one drive-through lane adjacent the transaction device;
   (h) communicating at least one signal corresponding to the departure, to the at least one telephone switching interface;
   (i) communicating at least one signal corresponding to the departure, from the at least one telephone switching interface to the telephone system;
   (j) communicating at least one signal. corresponding to the departure, to the at least one processor;
   (k) determining through operation of the at least one processor at least one departure time value corresponding to the departure; and
   (l) storing, in the at least one data store, through operation of the at least one processor, the at least one departure time value.

8. The method of claim 1 and further comprising:
   (g) sensing, with the at least one vehicle sensor, an arrival of the vehicle at a position at an exit from the at least one drive-through lane;
   (h) communicating at least one signal corresponding to the arrival, to the at least one telephone switching interface;
   (i) communicating at least one signal corresponding to the arrival, to the telephone system;
   (j) communicating at least one signal corresponding to the arrival, to the at least one processor;
   (k) determining through operation of the at least one processor at least one arrival time value corresponding to the arrival; and
   (l) storing, in the at least one data store, through operation of the at least one processor, the at least one arrival time value.

9. The method of claim 1
   wherein step (a) includes operating the at least one vehicle sensor to sense arrival of a vehicle in a drive-through lane,
   wherein step (e) includes determining through operation of the at least one processor, at least one arrival time value corresponding to the arrival sensed in step (a),
   wherein step (f) includes storing in the at least one data store, responsive to operation of the at least one processor, the at-least one arrival, time value determined in step (e),
   and further comprising:
   (g) operating the at least one vehicle sensor to sense a departure of the vehicle from the position in the at least one drive-through lane;
   (h) subsequent to step (g), operating the at least one vehicle sensor to communicate at least one signal corresponding to the departure sensed in step (g) to the at least one telephone switching interface device;
   (i) subsequent to step (h), operating the at least one telephone switching interface device to communicate at least one communication signal corresponding to the departure sensed in step (g) to the telephone system;
   (j) subsequent to step (i), operating the telephone system to communicate at least one signal corresponding to the departure sensed in step (g) to the at least one processor;
   (k) subsequent to step (j) determining at least one departure time value corresponding to the departure sensed in step (g) responsive to operation of the at least one processor; and
   (l) subsequent to step (k), storing in the at least one data store, responsive to operation of the at least one processor, the at least one departure time value determined in step (k).

10. The method of claim 1
    wherein the at least one telephone switching interface device is operative to generate DTMF signals,
    wherein the at least one telephone switching interface device comprises a Private Branch eXchange (PBX) interface device or a Private Automated Branch Exchange (PABX) interface device,
    wherein step (c) includes operating the at least one telephone switching interface device to communicate to the telephone system. at least one DTMF signal that corresponds to the vehicle sensed in step (a).

11. The method according to claim 1 wherein the facility comprises a pharmacy facility, wherein in step (a) includes operating at least one vehicle sensor to sense a vehicle at a position in a drive-through lane of the pharmacy facility.

12. A method of improving the operation of a facility adapted to accomplish transactions,
    the facility including:
    a telephone system,
    wherein the telephone system is operative to use dual-tone multi-frequency (DTMF1) signals,
    at least one drive-through lane,
    at least one transaction initiation device operative to alert a service provider within the facility,
    at least one transaction device usable in exchanging items with persons in vehicles in the at least one drive-through lane, at least one sensor operative to sense an occurrence of at least one event related to a person in a vehicle at a drive-through lane of the facility, at least one telephone exchange switching interface device in operative connection with the at least one sensor and the telephone system, wherein the at least one telephone exchange is operative to provide telephony signals that correspond to DTMF signals, at least one processor
in operative connection with
at least one data store and
the at least one telephone exchange, and
operative to
determine at least one characteristic associated with to the at least one event, and
cause the at least one characteristic to be stored in the at least one data store, the method comprising:
(a) sensing, with the at least one sensor, the occurrence of the at least one event related to a person in a vehicle at a drive-through lane of the facility;
(b) communicating at least one signal associated with the at least one event to the at least one telephone exchange, responsive to the sensing in step (a);
(c) receiving with the at least one telephone exchange, at least one signal communicated in step (b);
(d) operating the at least one telephone exchange to communicate at least one telephony signal associated with the at least one event to the telephone system; responsive to step (c),
wherein the at least one telephony signal corresponds to at least one DTMF signal;
(e) operating the at least one processor to receive at least one signal associated with the at least one event, responsive to step (d);
(f) determining responsive to operation of the at least one processor, at least one characteristic associated with the at least one event, responsive to step (e); and
(g) storing in the at least one data store, responsive to operation of the at least one processor, the at least one characteristic determined in step (f).

13. The method of claim 12 and further comprising:
(h) modeling using discrete event simulation software, the operation of the facility; and
(i) responsive to step (g), altering the operation of the facility, whereby the operation of the facility is improved.

14. The method according to claim 12 wherein in step (a) the facility includes a pharmacy.

15. The method according to claim 12 wherein in step (a) the facility comprises a bank.

16. The method according to claim 12 wherein in step (e) the telephone system includes the at least one processor.

17. A method of improving the operation of a facility adapted to accomplish transactions,
the facility including:
a telephone system,
at least one drive-through lane,
at least one transaction initiation device operative to alert a service provider within the facility,
at least one transaction device usable in exchanging items with persons in vehicles in the at least one drive-through lane,
at least one sensor operative to sense an occurrence of at least one event related to a person in a vehicle at a drive-through lane of the facility,
at least one telephone switching interface device in operative connection with the at least one sensor and the telephone system,
at least one processor
in operative connection with
at least one data store and
the at least one telephone switching interface device, and
operative to determine at least one characteristic corresponding to the at least one event, and cause the at least one characteristic to be stored in the at least one data store, the method comprising:
(a) sensing, with the at least one sensor, the occurrence of the at least one event related to a person in a vehicle at a drive-through lane of the facility;
(b) communicating at least one signal corresponding to the at least one event to the at least one telephone switching interface device, responsive to sensing in step (a);
(c) receiving with the at least one telephone switching interface device, at least one signal communicated in step (b);
(d) operating the at least one telephone switching interface device to communicate at least one dual-tone multi-frequency (DTMF) signal corresponding to the at least one event to the telephone system, responsive to step (c);
(e) operating the at least one processor to receive at least one signal corresponding to the at least one event, responsive to step (d);
(f) determining responsive to operation of the at least one processor, at least one characteristic corresponding to the at least one event, responsive to step (e); and
(g) storing in the at least one data store, responsive to operation of the at least one processor, the at least one characteristic determined in step (f).

18. A method of acquiring metrics at a facility adapted to accomplish transactions,
wherein the facility includes:
a telephone system,
at least one drive-through lane,
at least one transaction device operative to exchange items with persons in vehicles in the at least one drive-through lane,
at least one vehicle sensor operative to sense a vehicle at at least one position in the at least one drive-through lane,
at least one telephone switching interface device in operative connection with the at least one vehicle sensor and the telephone system,
wherein the at least one telephone switching interface device is operative to generate at least one dual-tone multi-frequency (DTMF) signal,
at least one processor in operative connection with at least one data store and in. operative connection with the at least one telephone switching interface device,
wherein the at least one processor is operative to determine at least one characteristic corresponding to the vehicle at the at least one position,
wherein the at least one processor is operative to cause a determined characteristic to be stored in the at least one data store, the method comprising:
(a) operating the at least one vehicle sensor to sense a vehicle at a position in the at least one drive-through lane;
(b) subsequent to step (a), operating the at least one vehicle sensor to communicate at least one signal corresponding to the vehicle sensed in step (a) to the at least one telephone switching interface device;

(c) subsequent to step (b), operating the at least one telephone switching interface device to communicate at least one DTMF signal corresponding to the vehicle sensed in step (a) to the telephone system;

(d) subsequent to step (c), operating the telephone system to communicate at least one signal corresponding to the vehicle sensed in step (a) to the at least one processor;

(e) subsequent to step (d), determining at least one characteristic corresponding to the vehicle sensed in step (a) responsive to operation of the at least one processor; and (f) subsequent to step (e), storing in the at least one data store, responsive to operation of the at least one processor, the at least one characteristic determined in step (e).

19. The method of claim 12 wherein the at least one telephone exchange is operative to generate DTMF signals, wherein the at least one telephone, exchange comprises a Private Branch eXchange (PBX) or a Private Automated Branch Exchange (PABX), wherein step (d) includes operating the at least one telephone exchange to communicate to the telephone system, at least one DTMF signal that corresponds to the at least one event.

\* \* \* \* \*